(12) United States Patent  (10) Patent No.: US 8,622,196 B1
Lapointe  (45) Date of Patent: Jan. 7, 2014

(54) ROLLER SORTER SYSTEM

(76) Inventor: Robin Lapointe, Dollard-des-Ormeaux (CA)

( * ) Notice: Subject to any disclaimer, the term of this patent is extended or adjusted under 35 U.S.C. 154(b) by 544 days.

(21) Appl. No.: 12/952,472

(22) Filed: Nov. 23, 2010

Related U.S. Application Data

(63) Continuation-in-part of application No. 12/079,516, filed on Mar. 27, 2008, now Pat. No. 7,861,845.

(60) Provisional application No. 60/922,386, filed on Apr. 9, 2007.

(51) Int. Cl.
*B65G 47/24* (2006.01)
*B65G 47/14* (2006.01)

(52) U.S. Cl.
CPC .................. *B65G 47/1492* (2013.01)
USPC ............ 198/383; 198/535; 198/624; 198/786

(58) Field of Classification Search
USPC .................................. 198/383, 786
See application file for complete search history.

(56) References Cited

U.S. PATENT DOCUMENTS

| | | | |
|---|---|---|---|
| 477,093 A | 6/1892 | Wead | |
| 483,225 A * | 9/1892 | Lampitt | 209/668 |
| 532,944 A * | 1/1895 | Breed | 209/615 |
| 1,604,133 A | 10/1926 | Rebechini | |
| 1,623,352 A * | 4/1927 | Madden et al. | 209/617 |
| 1,760,441 A * | 5/1930 | Risser | 221/171 |
| 2,367,757 A | 1/1945 | Cutler | |
| 3,113,574 A | 12/1963 | Greedy et al. | |
| 3,365,048 A | 1/1968 | Erlich et al. | |
| 3,778,964 A | 12/1973 | Rowland | |
| 3,884,347 A | 5/1975 | Gallagher et al. | |
| 3,913,798 A | 10/1975 | Allen | |
| 4,040,513 A | 8/1977 | Walls | |
| 4,254,898 A | 3/1981 | Davis | |
| 4,308,638 A | 1/1982 | Senussi | |
| 4,434,886 A | 3/1984 | Fajt | |
| 4,744,455 A | 5/1988 | Dragotta et al. | |
| 5,175,906 A * | 1/1993 | Holter | 15/3.16 |
| 5,360,119 A * | 11/1994 | Nakamura et al. | 209/618 |
| 5,522,512 A | 6/1996 | Archer et al. | |
| 6,505,460 B2 | 1/2003 | Aylward | |
| 6,568,151 B2 | 5/2003 | Buckley et al. | |
| 6,997,341 B2 | 2/2006 | Pearson et al. | |
| 7,318,304 B2 | 1/2008 | Hiddink et al. | |

* cited by examiner

*Primary Examiner* — William R Harp
(74) *Attorney, Agent, or Firm* — Richard L. Marsh

(57) ABSTRACT

This device feeds and sorts tablets or small parts from a common hopper to a product count sensor head. Two parallel feed rolls and two transport rollers rotate together on an adjustable incline. The feed rolls are positioned above the transport rolls. The rotation direction of each feed and transport roller can vary along with its speed. As the feed rollers rotate the feeding threads will push out the product from the hopper and drop the product onto the transport rollers which will sort them along the length of the transport rollers. As the roller angle increases so does the product feed rate.

20 Claims, 21 Drawing Sheets

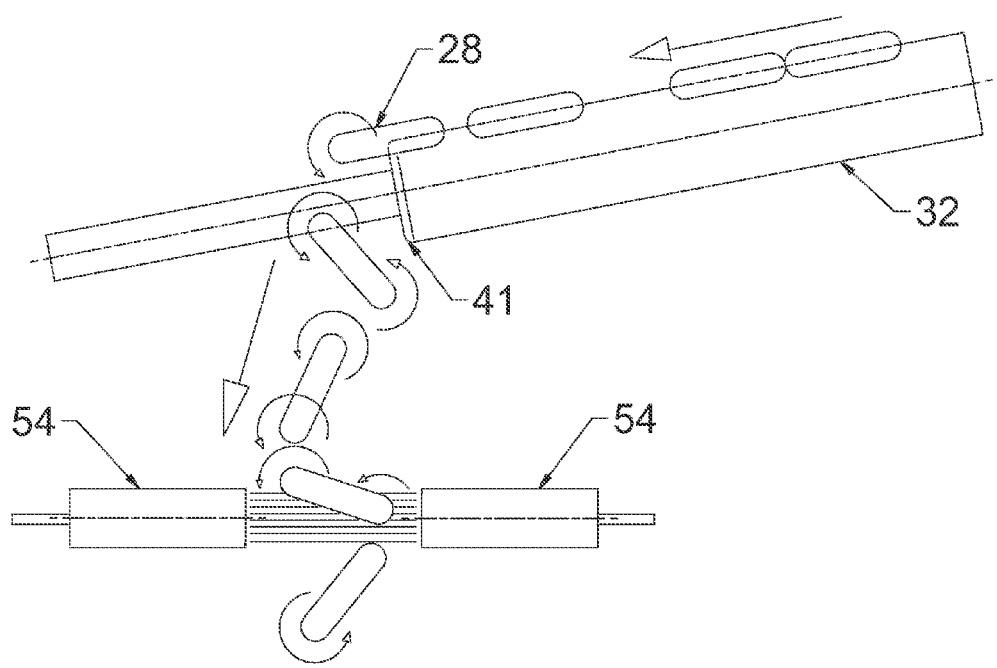

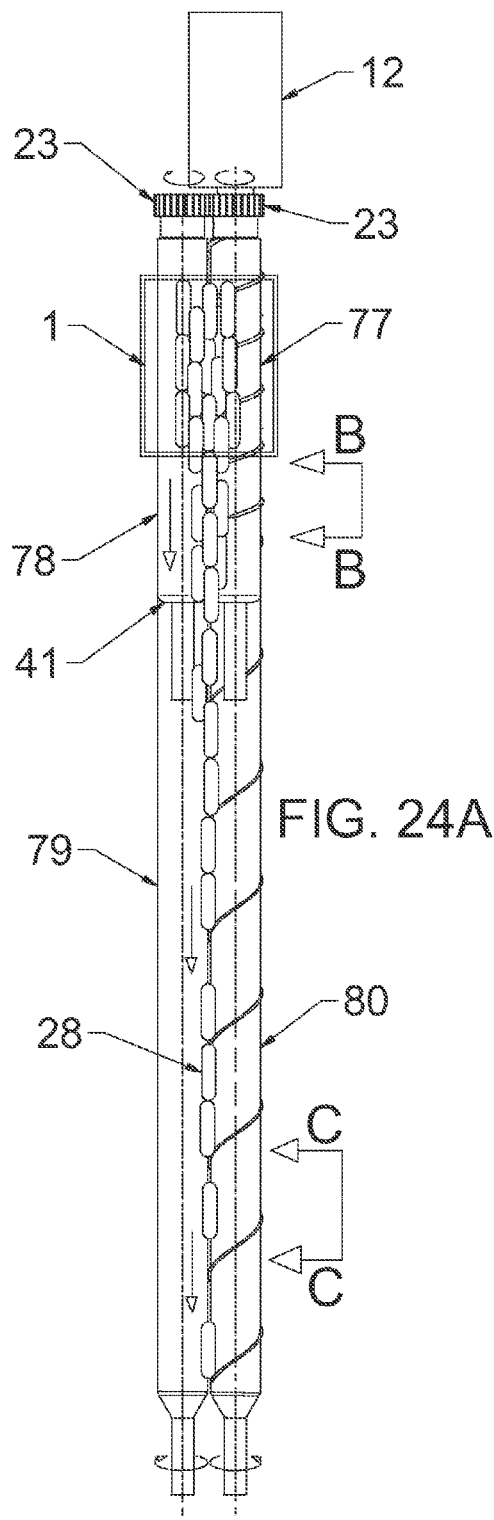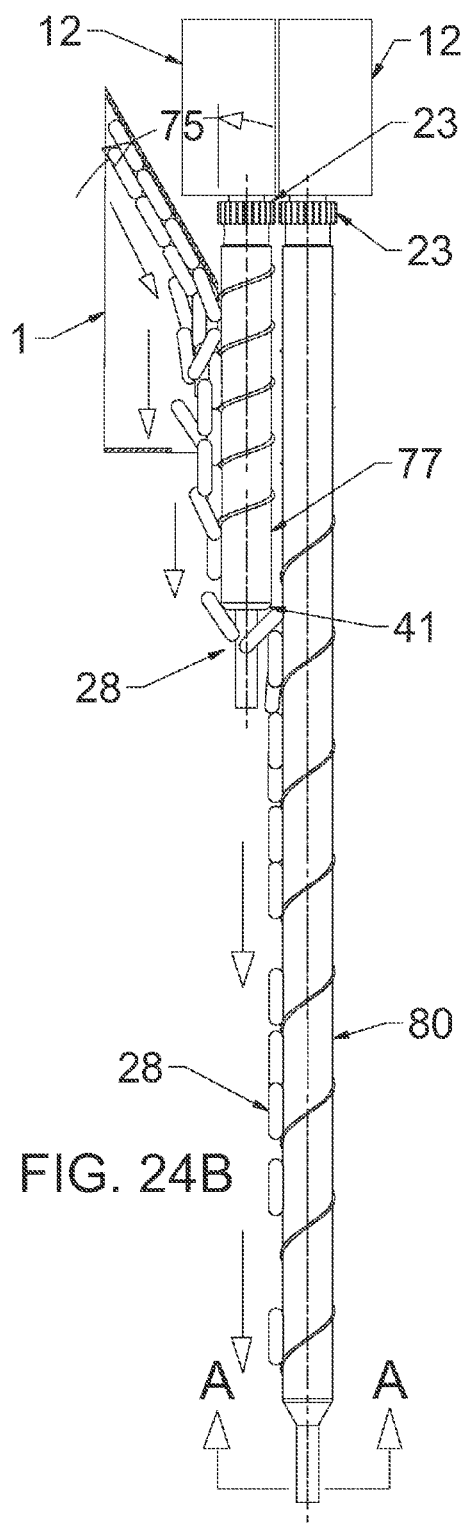

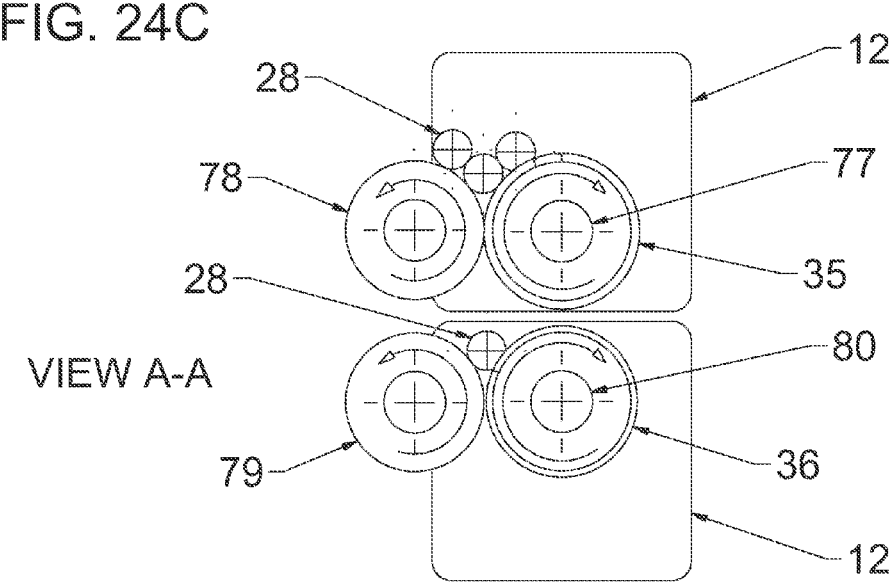
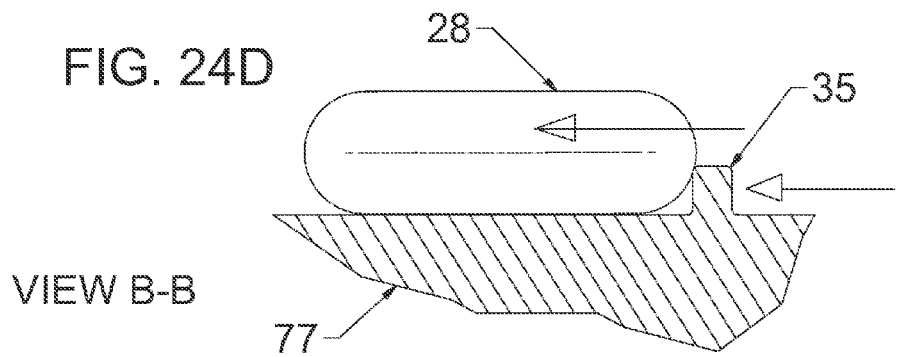
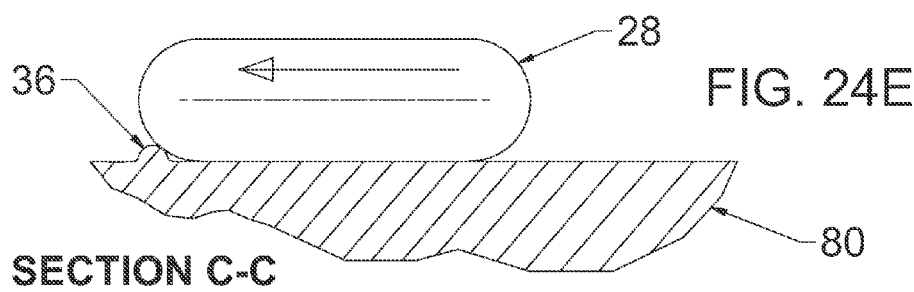

ROLLER SORTER SYSTEM

CROSS REFERENCE TO RELATED APPLICATIONS

This application is a continuation-in-part application of Applicant's non-provisional application Ser. No. 12/079,516 filed on 27 Mar. 2008, now U.S. Pat. No. 7,861,845, which is a non-provisional application of Applicant's provisional application Ser. No. 60/922,386 filed on 9 Apr. 2007.

BACKGROUND OF THE INVENTION

1. Field of the Invention

This invention is a feed and transport system to transport and count items of a tablet form from a common stored area to a product counting sensor head. Two parallel feed and transport rollers align the product before allowing it to exit downwards past a product sensor.

2. Prior Art Statement

Machines currently in use have problems feeding tablets or small parts smoothly, accurately, quickly and in line to a product sensor. Common practice is to vibrate tablets in a vibratory bowl or down "V" shaped vibrating channels by a product sensor. Part of the problem with vibrating the tablets are that the vibration itself could damage the product, thus producing dust that must later be extracted before the product can be packaged. Also, vibration is loud and there is a maximum output product feed rate that any vibrator can produce. Another problem is that on high speed counting machines several vibrating "V" shaped channels are operated by one vibrator, thus making it impossible to control the feed rate of only one "V" shaped channel at a time. For instance, see the Batchmaster® II brochure and/or the Batchmaster® III brochure from Batching Systems Inc., 50 Jibsail Drive, Prince Frederick, Md. 20678.

Rotating centrifugal discs or discs with pockets are also used to align and to feed tablets into a straight row. Tablets are deposited on to a rotating flat surface which rotates and centrifugal force moves the tablets to the outside guide over the disc to align the tablets into a straight row. These types of systems are prone to jamming and could require changing parts to suit different tablet sizes and shapes. For instance, see the RTC 15 and RTC 200 brochures from Romaco US, 104 American Road, Morris Plains, N.J. 07950.

Another common method of feeding tablets is using a horizontal rotating disk. Centrifugal force forces the tablets to an outside guide. Many times there would be two or more rows of tablets together, so special adjustable deflectors are used to separate them toward the most outward row. This type of system could also cause product jamming or damage. For instance, see the brochure on the Pharmafill Model TC4 manufactured by Deitz Co., 1750 Route 34, P.O. Box 1108, Wall, N.J., 07719.

Another method is using a rotating vacuum disc, sucking the tablets to it. These discs are normally shaped to suite different tablet profiles. For instance, see U.S. Pat. No. 6,505,460 issued on 14 Jan. 2003 to John T. Aylward. A related method and apparatus is a machine with a rotating vacuum drum having holes disposed through one face of the drum wherein a vacuum is supplied to that face which holds tablets against the drum face until dropped by removal of the vacuum. For instance, see the U.S. Pat. No. 6,997,341 issued to Pearson, et al., on 14 Feb. 2006.

Yet another method is having moving or rotating pockets designed specifically for each different tablet Profile. This method is expensive, complicated, it takes a lot of time to clean and to change over, and dedicated to tablet size and shape. For instance, see the Pragron CC30 brochure of Pragron Engineering Co., Plot No. 164/B, Door No 1, 1st floor Daudi Road, Off Kalyan Shill Road, Dombivali (E) Thane—400 606—Maharashtra, India.

A method of conveying contamination sensitive product to containers to be filled is disclosed in U.S. Pat. No. 6,568,151 issued to Buckley, et al., on 27 May 2003 wherein a conveyor belt with pockets moulded in to suit each tablet shape and size moves the product toward an end thereof where the product drops into aligned containers. The belt is discarded with each run of product.

All of these common practices are either expensive, noisy, may damage the product, dedicated to given tablet size, and/or each lane is not independently controllable.

It is also known to align product into a given orientation using inclined, spaced apart rolls rotating in the same direction. A typical device is shown in U.S. Pat. No. 477,093 issued on 14 Jun. 1892 to Charles K. Wead. The spacing between the rolls is critical in order to allow a narrow portion of the article to drop between the rolls thus aligning the article in the proper orientation.

Another method of aligning product into a given orientation is disclosed in U.S. Pat. No. 4,434,886 issued to John Fajt on 6 Mar. 1984 wherein the inclined, spaced apart tapered rolls are counter rotating. Parts are deposited adjacent the large end of the rolls and the parts assume a particular orientation by action of the rolls and incline. The parts are moved to the small end of the rolls and accumulated thereat by spring wires.

It is further known to provide a seed planter with counter rotating rolls disposed below a seed hopper wherein the rolls transport seed to a drop point. For instance, see the U.S. Pat. No. 3,913,798 issued on 21 Oct. 1975 to Steve R. Allen or the U.S. Pat. No. 1,604,133 issued on 26 Oct. 1926 to Eugene Rebechini The rolls of these devices have grooves disposed into the surface thereof which is detrimental to formed tablets of the pharmaceutical industry. Grooved rolls tend to chip, fracture and abrade these formed tablets. Therefore, it is of great importance to provide a sort and transport roller with a smooth surface and/or a superimposed thread to reduce the incidence of breakage or dusting.

Finally, it is known to introduce pharmaceutical products into blister packs with an apparatus that has counter rotating rolls of a particular configuration in order to allow the product to drop between the rolls into wells of the blister pack. For instance, see the U.S. Pat. No. 7,318,304 B2 issued on 15 Jan. 2008 to Hiddink, et al.

All of these rotating roll devices rely upon precise configuration of the rolls and critical spacing in order to perform the particular task. In order to perform a similar task on a different product, either the spacing must be changed, the rolls reconfigured to accommodate the new product or both.

BRIEF SUMMARY OF THE INVENTION

Accordingly, the aforementioned problems and difficulties are obviated by the present invention. This high-speed item feeder provides a quiet, individual, non-change part feeding system for tablets or small parts. Items to be transported, counted and collected in a container are either circular, spherical, oblate spheroid, cylindrical or oblong, hereinafter tablets, in general and round tablets for circular or spherical items and capsule tablets for cylindrical or oblong items. Such items may be medicaments, confections, toys, wooden or metal plugs, caps, pins and the like. Thus, round tablets usually have a thickness less than the diameter thereof or may be entirely spherical. In contrast, capsule tablets have a greater length than width and/or height. The device of this invention is short in length and can adapt to most tablet shapes and sizes. It's individually controlled and feeds and separate tablets/parts in a single row towards a product count sensor.

Therefore it's among the primary objectives of this invention to provide a spaced out single row of tablets towards a product count sensor head.

A second object of this invention is to provide two parallel rollers with or without different thread configurations in order to drive tablets or product along its length from a hopper to its lower discharge end.

A third objective of the present invention is to be able to control the speed and direction of rotation of the feed and transport rollers and to be able to start and stop the rollers to control each individual feeding lane.

A fourth objective is to have the two feed and transport rollers with or without feed threads extended into the product hopper which will assist in pushing the product out of it.

A fifth objective is to have two feed rolls with or without feed threads extended under a product hopper which will assist in pushing the product out of the hopper transport rollers.

A sixth objective is to have two sort and transport rollers with or without feed threads that extend beyond an end of two feed rolls for sorting objects dropped thereon by the feed rolls into a stable and steady stream.

Yet another objective is to provide a hopper with a sloped bottom wall disposed above two feed rolls wherein the sloped wall terminates adjacent a square thread superimposed upon the feed rolls.

Still another objective is to provide a counting and reject block with a curved wall which has a center point on a pivot of a roller module to direct tablets smoothly toward a counting field established by a counting sensor.

Another objective of the invention is to demonstrate different feed thread configurations and surface finishes that will assist in transporting the product along the parallel rollers.

Still another objective of the invention is to be able to control the angle of the rollers so as to increase the feed rate of the tablets/parts, and/or to reduce the flow as the tablets could have a tendency to roll or slide easily.

A last objective is to add in a lane divider along the centre line of the feed and transport rollers thus creating two separate tablet lanes with its own tablet sensor. By doing so effectively, the tablet output rate could be doubled.

BRIEF DESCRIPTION OF THE DRAWINGS

The features of the present invention which are believed to be novel are set forth with particularity in the appended claims. The present invention, with respect to its organization and manner of operation, together with further objects and advantages thereof, may best be understood by reference to the following description, taken in connection with the accompanying drawings in which:

FIG. 12 C shows a transport roller with a groove thread along its length.

FIG. 16 C shows capsule shaped tablets and how they are fed and rotated along the length of the transport rollers between a hopper outlet and a tablet deflector.

FIG. 16 D shows a capsule shaped tablet turned upwardly on one end prior to engaging against a tablet deflector.

FIG. 16 E shows the capsule shaped tablet of FIG. 16D turned from a tilted orientation toward one end at the tablet deflector and a plurality of following tablets progressing along the length of the feed and transport rollers between a hopper outlet and the tablet deflector.

FIG. 17 B shows another side view of the tablet deflector with a capsule shaped tablet angled down passing under the tablet deflector.

FIG. 18 B shows an end view of the rollers, divider, counter, tablet chutes and portions of the side guides of FIG. 18 A.

FIG. 18 C shows a partial top view of the end of the rollers and the tablet chutes of FIG. 18A.

FIG. 18 D shows an end view of a plurality of fixed lane rollers of FIG. 18B arranged in side by side relationship.

FIG. 18 E shows an end view of individual rollers spaced closely together with equally spaced lane dividers.

FIG. 21 is similar to FIG. 10A wherein elongated objects are shown tumbling off a blunt end of prior art rollers, the elongated objects oriented randomly toward and through a counting sensor wherein a front roller has been removed for clarity.

FIG. 22 B is a plan view of a portion of a sorting and counting assembly shown dropping elongated objects against a planar chute wall wherein the tablets drop randomly through a product count sensor.

FIG. 23 B is a plan view of a portion of a sorting and counting assembly having a curved chute wall guiding round objects in an orderly fashion toward and through a product count sensor.

FIG. 24 A is a top plan view of a feed, sort and count assembly having at least one feed roll disposed above at least one sort roll.

FIG. 24 B is a side plan view of the feed, sort and count assembly of FIG. 24 A showing an angled wall of a hopper.

FIG. 24 C is an end view of the feed, sort and count assembly of FIG. 24 A.

FIG. 24 D is a section view of a threaded feed roller of the feed, sort and count assembly of FIG. 24 A showing a profile of the feed thread of the feed roll.

FIG. 24 E is a section view of a threaded transport roller of the feed, sort and count assembly of FIG. 24 A showing a profile of the transport thread of the feed roll.

DETAILED DESCRIPTION OF THE INVENTION

While the various features of this invention are hereinafter described and illustrated as a roller sorter system for tablets, it is to be understood that the various features of this invention can be used singly or in various combinations thereof for a tablet roller sorter system as can hereinafter be appreciated from a reading of the following description.

Figure 1:
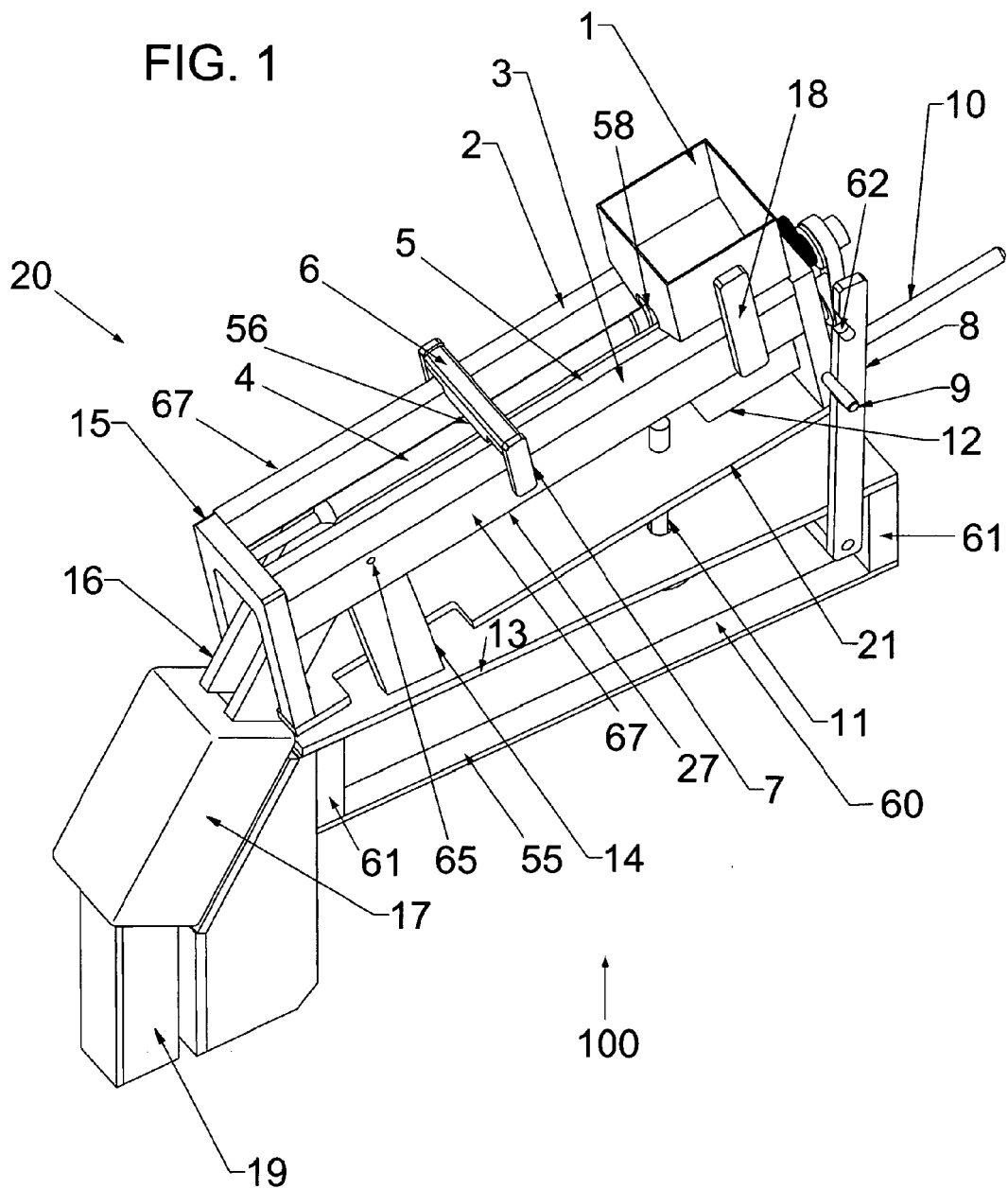
FIG. 1 is a left upper frontal isometric view of the high speed tablet feeder of this invention.
Figure 2:
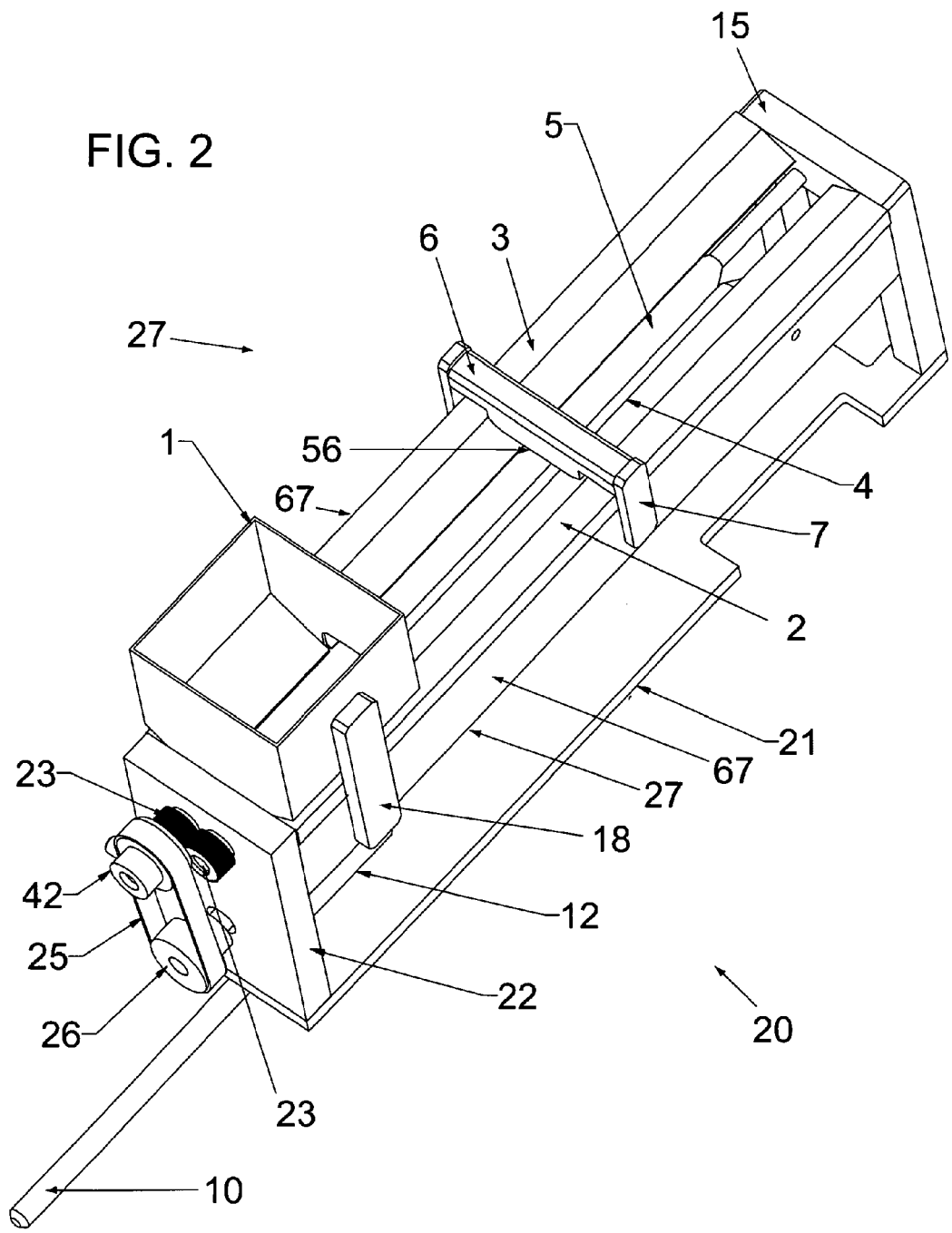
FIG. 2 is an right upper rear isometric view of the roller module of the high speed tablet feeder of FIG. 1.

FIG. 1 shows an isometric view of the high-speed tablet feeder 100 of this invention. High speed tablet feeder 100 is made up of a base frame 55, a tablet chute 16, a reject block 17, a discharge chute 19 fixedly mounted to base frame 55 and a roller module 20 pivotally mounted upon frame 55. Referring also to FIG. 2 and FIG. 3B, roller module 20 comprises two parallel transport rollers 4 and 5 spaced apart and driven by a common prime mover 12, transport rollers 4, 5 journaled in a drive plate 22 and an end plate 15 of a frame 27. Frame 27 also comprises identical side plates 67 joined to end plate 15 and drive plate 22, drive plate 22 and end plate 15 affixed to a pivot plate 21 supporting rollers 4, 5 in a spaced relationship from pivot plate 21. Roller module 20 is pivotable relative to base frame 55 around at least one pivot 65, pivot 65 disposed through at least one side plate 67 and at least one pivot support 14, pivot support 14 fixedly attached to base frame 55. Side plates 67 preferably have tablet guides 2, 3 affixed to a top surface thereof, tablet guides 2, 3 provided with mirror image slopes 66, best shown in FIG. 9, slopes 66 terminating approximately at a centerline 69 of rollers 4, 5. Slopes 66 direct tablets 28, 29 toward a centerline between rollers 4, 5 and prevent tablets 28, 29 from climbing either roller or roller 5 when at least one of rollers 4, 5 is rotating upwardly and outwardly from a centerline between rollers 4, 5. A hopper 1 is disposed above and between tablet guides 2, 3 of side plates 67 adjacent drive plate 22 and has legs 18 thereof affixed to side plates 67, legs 18 retaining hopper 1 in spaced relationship to tablet guides 2, 3 and rollers 4, 5. Hopper 1 has an exit port 58 disposed generally in line with rollers 4, 5 and rollers 4, 5 each have a feed thread 35 disposed therearound which spans the length of hopper 1 from drive plate 22 through and beyond exit port 58. Feed thread 35 dispenses tablets 101 through exit port 58 and onto smooth surfaces 57, 59 of rollers 5, 4 respectively whereupon tablets 101 move along rollers 4, 5 to tablet chute 16 for counting and subsequent packing into a container generally disposed beneath discharge chute 19. Side plates 67 have a deflector assembly 6 movably associated therewith, deflector assembly 6 having a lower edge 56 disposed between tablet guides 2, 3 and disposed in proximity to feed rolls 4, 5. In the preferred embodiment shown in FIG. 1, and as best shown in FIG. 3B, feed roll 4 has smooth surface 59 extending beyond exit port 58 of hopper 1 to end plate 15 and feed roll 5 is a fluted roll having a thread 36 built upon a smooth surface 57, the function of rollers 4, 5 to be fully set forth hereafter. Pivot plate 21 has a handle 10 extending beyond frame 27, handle 10 used to pivot roller module 20 relative to base frame 55 around pivot 65 to provide for different traverse speeds along smooth portions of rollers 4, 5, 30-32.

Figure 6:
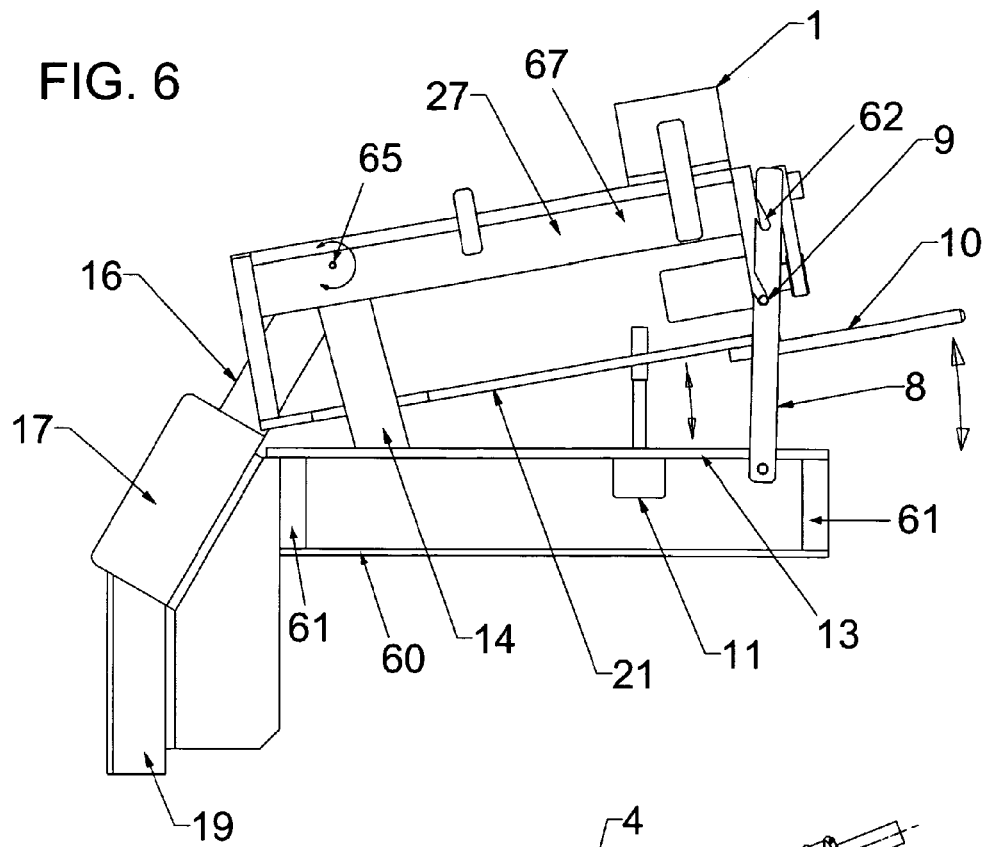
FIG. 6 is a frontal plan view of the high speed tablet feeder of FIG. 1 indicating roller module tilting methods.

Referring to FIGS. 1 and 6, base frame 55 comprises a pair of bottom rails 60, only one visible, which have end blocks 61 affixed thereto. End blocks 61 support a top plate 13 of base frame 55 in spaced relationship to bottom rails 60. Pivotally mounted adjacent one end block 61 and opposite tablet chute 16, is a pin support 8, pin support 8 having a plurality of notches 62 disposed into one edge thereof for receiving a pin 9 protruding from drive plate 22 of roller module 20. Top plate 13 has pivot support 14 extending upwardly therefrom, pivot support 14 provided with pivot 65 adjacent an upper end thereof. Pivot 65 may comprise a roll pin or the like, pivot 65 passing through side plates 67 and pivot support 14. Pivot support 14 and pin support 8 cooperate to allow roller module 20 to be disposed at various angles relative to base frame 55. When handle 10 of roller module 20 is lifted to tilt roller module 20, and hence rollers 4, 5, pin 9 is engaged within one notch 62 to retain roller module 20 at a specific angle to enhance movement of tablets 101 downwardly along rollers 4, 5. A jacking motor 11 is supported by top plate 13 for mechanically raising and lowering roller module 20, however, roller module 20 may also be raised by hand using handle 10. At the beginning of an operation, tablets 101 are placed into hopper 1 in engagement with thread 35 of rollers 4, 5. As transport rollers 4 and 5 rotate along their axis, tablets 101 are pushed through exit port 58 of hopper 1 and along the length of transport rollers 4 and 5. As the angle of roller module 20 is increased, tablets 101 will flow more easily due to gravity. Also, as tablets 101 travel down the centerline between transport rollers 4 and 5, they are separated by the action of thread 36 and the rotation of transport rollers 4, 5. Referring also to FIG. 3B, tablets 101 then exit at exit drop point 64 of transport rollers 4 and 5 and drop down tablet chute 16, through a product sensor/reject block 17 and are then gated and discharged through a discharge chute 19 into an empty container (not shown) below.

Referring now to FIG. 2 specifically, a typical drive arrangement of prime mover 12 drives a driver pulley 26 and through belt 25 drives driven pulley 42. Driven pulley 42 is affixed to an end of roller 5 and drives a gear 23 which in turn drives transport roller 4 through another gear 23. Prime mover 12 is preferably mounted to drive plate 22 with a shaft protruding through drive plate 22 for affixing pulley 26 thereto. Likewise, roller 5 extends through drive plate 26 a sufficient distance in order to affix gear 23 and driven pulley 42 thereto and roller 4 extends through drive plate 26 far enough to mount its driven gear 23. In another embodiment, prime mover 12 may be coupled directly to gear 23, therefore not using the belt 25 and pulley 42 and 26 arrangement. In yet another embodiment, a "V" belt or "O" ring type belt, could be used to replace the drive shown. This system would allow for slippage of feed screws 4, 5 if some tablets 101 should get jammed in hopper 1 exit port 58. Tablet deflector 6 is supported slightly above tablet guides 2, 3 disposed on side plates 67 and has legs 7 extending downwardly alongside side plates 67. Legs 7 may be attached to side plates 67 or may be movable therealong for repositioning tablet deflector 6 in multiple positions along side plates 67.

Figure 19:
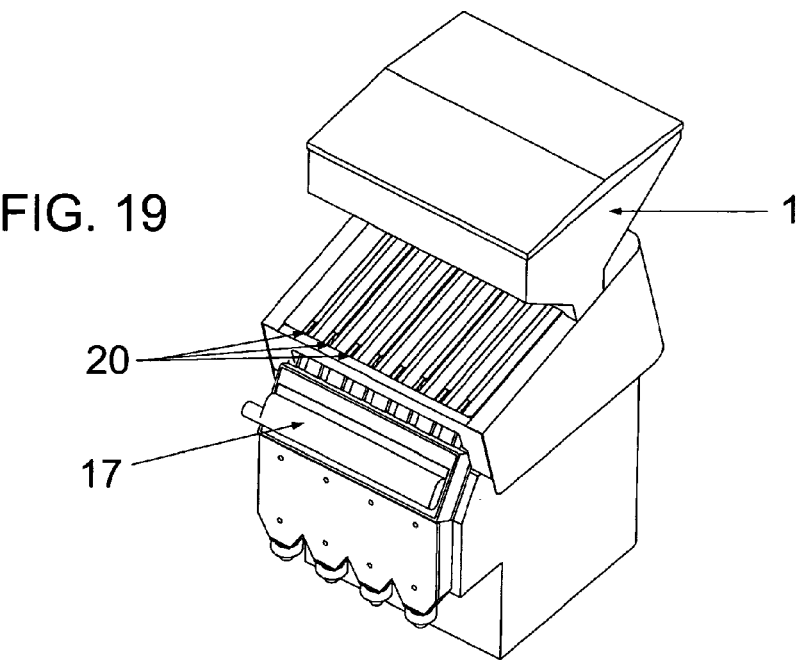
FIG. 19 shows several feed and transport roller systems assembled parallel to one another to form a common high output machine.
Figure 20:
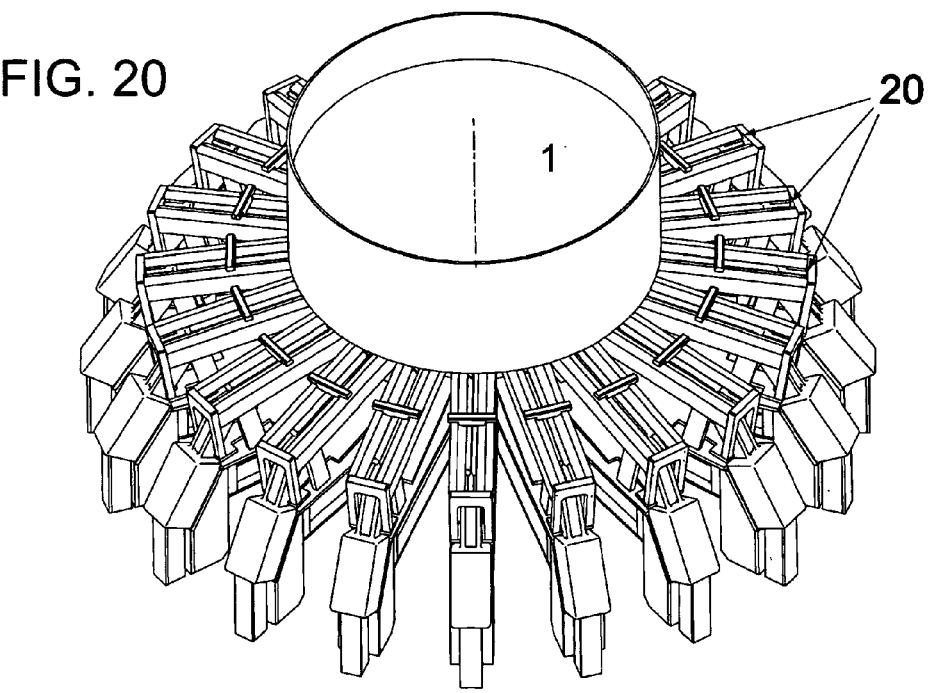
FIG. 20 shows multiple feed and transport roller systems equally spaced around a common centre to create a rotary filling machine.

As is apparent from FIG. 2, roller module 20 is removable from base 55 by removal of pivot 65, thus allowing roller module 20 to be lifted free of base 55. Roller module 20 as shown now separated from base 55 could be stacked or arranged with other roller modules 20 to form a high output capacity machine with each roller module 20 having its own drive and control system as is shown in FIGS. 19 and 20. Referring now to FIG. 19 a high speed tablet feeder machine comprises multiple pairs of roller modules 20, equally spaced, in side by side relationship, independently acting and discharging tablets 101 past at least one product count head 17 through a tablet gating system into separate containers below. All of these roller assemblies 20 would be fed from a common hopper 1 and tilting device. This high speed tablet feeder machine would have an independent prime mover and control systems for each roller module 20 to separately control each tablet pair feed rate and their starting and stopping points. Alternately, roller modules 20 may all discharge through a common counting head with discharge into a single container for bulk packing of production runs.

Referring now to FIG. 20, a high-speed rotary tablet-filling machine comprises many roller modules 20 grouped together with a common hopper 1 and tilting arrangement in a circular orientation, equally spaced from a common centre point outwards. Each roller module 20 would have an independent prime mover 12 and control system (not shown). This group of roller modules 20 would rotate around their common centre axis while each set of roller modules dispense tablets 101 to a single container below. Other configurations of multiple roller modules 20 of this invention may be designed to take advantage of the high speed feeding nature of roller modules 20. Another version of this high speed counting machine comprises the option of adding or removing high speed tablet feeder modules in order to increase the overall machine tablet output rate. This machine would be made out of individual roller modules that are operated independently out of one controller.

Figure 3A:
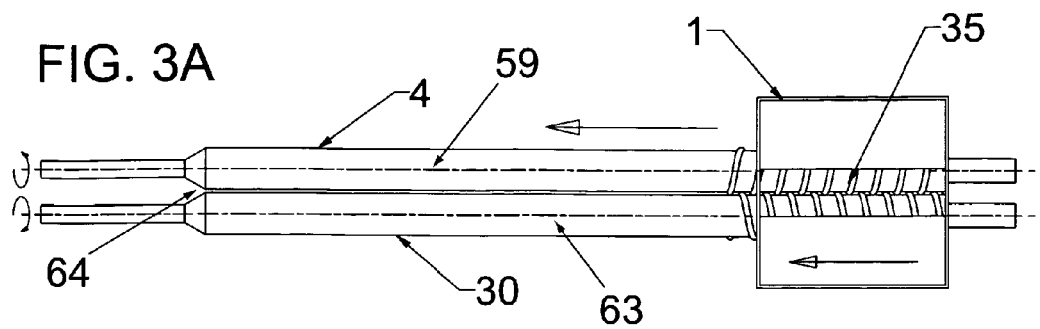
FIGS. 3 A, B, C, D are top plan variations of the transport rollers for the roller module of FIG. 2.
Figure 3B:
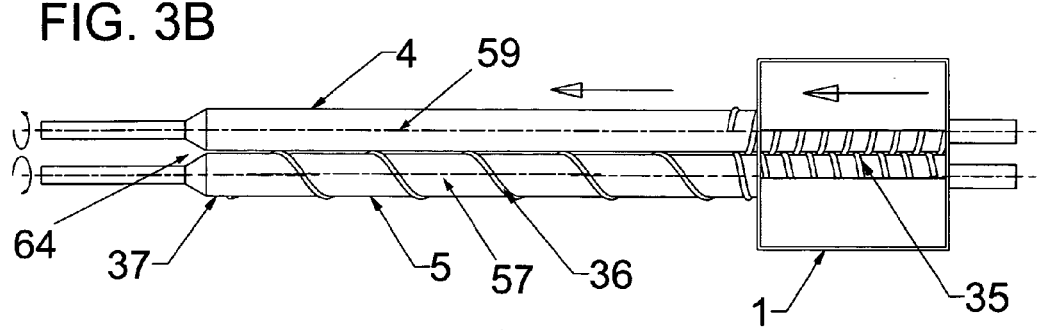
Figure 7:
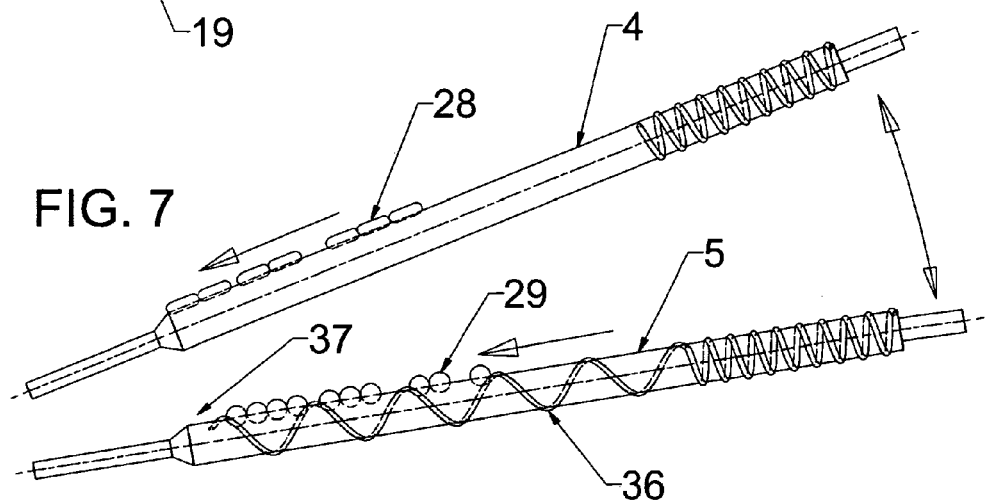
FIG. 7 shows tablets on the transport rollers at different angles indicated in FIG. 6.

Referring now to FIG. 3A and FIG. 7, FIG. 3A shows a pair of smooth transport rollers 4 and 30 after feed thread 35 ends proximate exit port 58 of hopper 1. Smooth rolls 4, 30 are well suited for capsule tablets 28 having a longitudinal length greater than the transverse width or diameter, if round. Feed threads 35 are used to help feed and push capsule tablets 28 out of hopper 1, preferably seriatim, however, exit port 58 of hopper 1 is sufficiently large to pass all sizes and shapes of tablets 101. It should be apparent that although capsule tablets 28 generally have the greatest length, the aspect ratio of height or thickness to length is less than some round tablets 29. Thus, more than one capsule tablet 28 may pass through exit port 58 and become "piggy backed" upon at least one other capsule tablet 28. Accordingly, exit port 58 of hopper 1 may be fitted with a movable gate to assist with an orderly discharge of tablets 28, 29 from hopper 1. Smooth rolls 4, 30 allow tablets 101 to move freely upon the outer surfaces 59, 63 respectively, thereof, and with an increasing angle to roller module 20, capsule tablets 28 may become dislodged from the "piggy backed" relationship by the rolling action of rollers 4, 30, however, as will be fully explained later, mechanical means is also provided to ensure that "piggy backed" tablets 101 are not permitted to pass a tablet counter sensor 54 thus ensuring an accurate count of tablets 101 in all containers.

Figure 4:
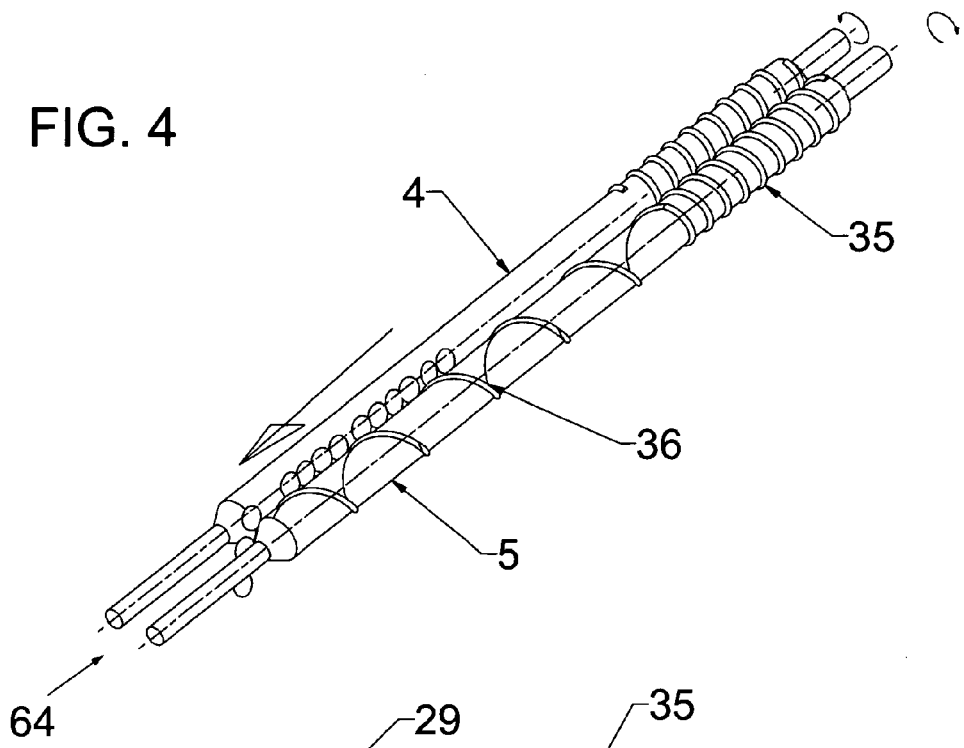
FIG. 4 is a left upper frontal isometric view of typical round tablets being transported on the transport rollers of the preferred embodiment shown in FIG. 3 B.

FIG. 3B shows a roller arrangement similar to FIG. 3A, but instead of having two smooth rollers, transport roller 30 was replaced with threaded roller 5 having thread 36 disposed upon smooth surface 57, thread 36 disposed at a higher angle helix than thread 35 under hopper 1. This arrangement, as shown in FIG. 4, helps feed round shaped tablets 29, separate them, and control their travel as they roll and move down towards exit drop end 64 of transport rollers 4 and 5. As a round tablet 29 encounters thread 36, that round tablet 29 will follow thread 36 downwardly toward exit drop point 64 of rollers 4, 5 allowing other round tablets 29 to follow in close proximity. Typically, at the high speed rate of roller module 20 of this invention, round tablets 29 are disposed in a contiguous sequence along the length of rollers 4, 5.

Figure 3C:
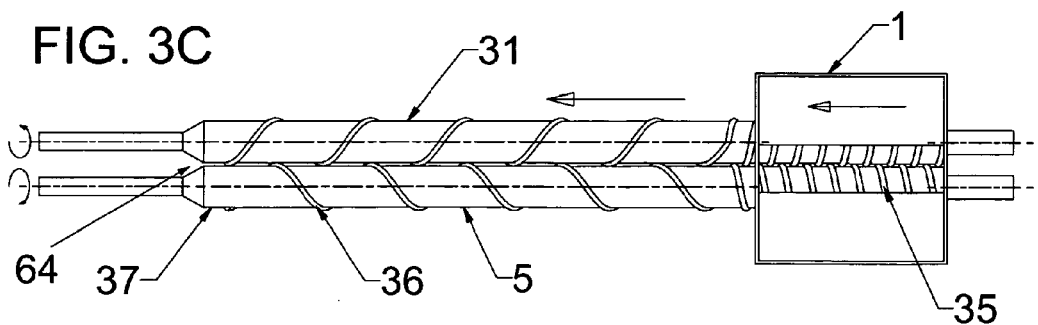

FIG. 3C is similar to FIG. 3B, but roller 4 has been replaced with a threaded roller 31, threaded roller 31 having a thread 36 disposed in opposite hand to thread 36 of roller 5. As both rollers 31 and 5 are threaded, there is a greater tendency to push round tablets 29 toward exit drop point 64 thus increasing the overall rate of production. The counter rotating threads serve as well to increase the transport rollers 31 and 5 round tablets 29 stopping ability.

Figure 3D:
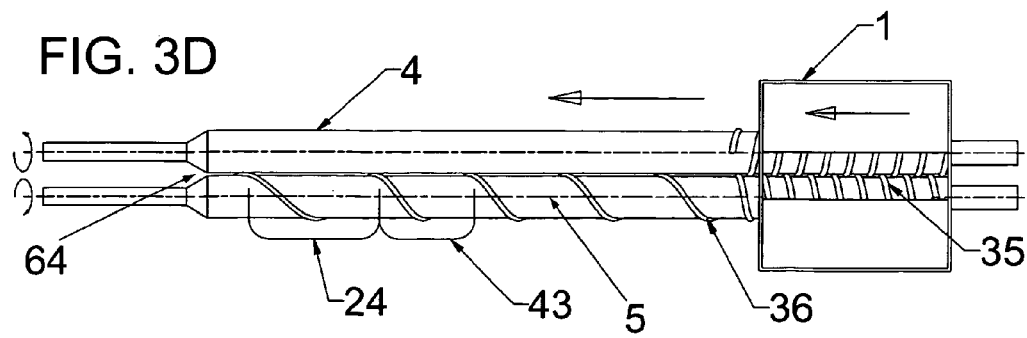

FIG. 3D shows threaded transport roller 5 having a higher pitch thread 24 adjacent exit drop point 64 with a variable thread pitch 43 or transition thread 43 on roller 5 between standard pitch thread 36 and high speed thread 24. Thus, as thread 36 extends toward exit drop point 64 of roller 5, the pitch of thread 36 increases. This produces more space between the flutes of threads 36, thus spacing out round tablets 29 more therefore resulting in less doubling up of round tablets 29 at exit drop point 64. FIG. 3D shows smooth roller 4 and compound thread roller 5, however, a cooperating compound roller 5 may be used in place of smooth roller 4 without detriment to the function of roller module 20.

FIG. 4 shows threads 36 separating the flow of round tablets 29 along the length thereof. Threads 36 prevent round tablets 29 from rolling uncontrollably off exit drop point 64 of transport rollers 4 and 5. When transport rollers 4 and 5 stop turning, threads 36 act as a stop and prevents round tablets 29 from rolling off exit drop point 64 while rollers 4, 5 are stopped.

Figure 5A:
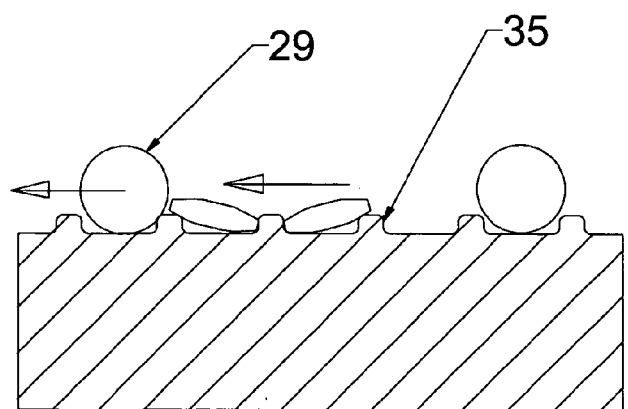
FIG. 5 A is a cross section of the roller feed threads of the threaded rollers of FIGS. 3 A-3D while FIG. 5 B is a cross section of the transport roller thread of the threaded rollers of FIGS. 3B-3D.

FIG. 5A shows a cross section view of tablet feed threads 35 of all rollers 4, 5, 30-32 which are located under hopper 1. A typical tooth profile of thread 35 is shown, threads 35 spaced closer together compared with transport threads 36. Tablet feed threads 35 have rounded edges so as not to damage tablets 101 but have straight sides to allow maximum pull or feeding of the tablets 101 from hopper 1 through exit port 58. Feed threads 35 under hopper 1 tend to agitate and rotate tablets 28, 29 thus dislodging dust associated therewith wherein the dust and any chips contained in the bulk of tablets will drop through a gap 39 between rollers 4, 5, 30-32 into a tray or be drawn away from roller assembly 20 in a vacuum system.

Figure 5B:
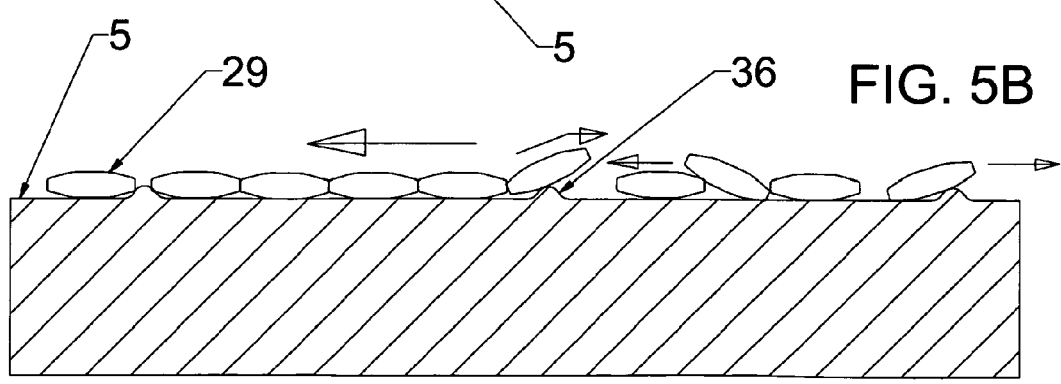

FIG. 5B shows across section view of the transport threads 36 of rollers 5, 30-32. These threads 36 are spaced further apart compared with tablet feed threads 35. Transport threads 36 group several round shaped tablets 29 together which act as a stop when transport roller 5 is not rotating. The tooth profile of transport threads 36 is rounded in order not to damage tablets 101. Additionally the tooth profile does not have straight right angle sides so as to enable tablets 101 to slide over the top of transport threads 36 in order to fill in any tablet gaps in the tablet stream. The principle is not only to allow the flow of tablets 101 to spread out evenly along the length of the transport roller 5, but also to prevent round tablets 29 from rolling off of exit drop point 64 of transport roller 5 when the roller has stopped.

FIG. 6 shows a side view of high-speed tablet feeder 100. The two possible methods of tilting roller module 20 of high-speed tablet feeder 100 are shown. As previously set forth, one method is to use jacking motor 11 extending or retracting a screw which will raise or lower pivot plate 21 and hence entire roller module 20, thus increasing or decreasing transport roller angle. Another way to change the angle of roller module 20 is to manually lift tilt handle 10 up or down. As roller module 20 is raised by tilt handle 10, tilt pin 9 is relocated into one of notches 62 in tilt plate 8. Likewise, when roller module 20 is lowered, tilt handle 10 is used to support roller module 20 while disengaging pin 9 from one notch 62. Roller module 20 is then lowered to a desired angle and has pin 9 re-engaged with another notch 62. Although only two notches 62 are shown in tilt plate 8, any number of notches 62 may be provided consistent with the size of notches 62. Thus, as tilt plate 8 is pivotable upon, and relative to frame 55, the angle of roller module 20 relative to frame 55 may readily be altered.

FIG. 7 shows different angles for transport of common round tablets 29 and capsule shaped tablets 28. Raising roller module 20 and hence transport rollers 4 and 5 will increase tablet flow rate on smooth sections 57, 59 of rollers 4, 5. Since round tablets 29 will start to roll at a smaller angle as compared to an angle allowing capsule shaped tablets 28 to slide, the angle of tilt of roller module 20 need not be as great for round tablets 29. However, by holding back round tablets 29 against thread 36 will result in tablet transport threads 36 allowing transport roller 5 to be disposed at a greater angle than the angle of repose for round tablets 29. Though applicable to rollers 4, 5, 30-32 but best visible in FIG. 7, the last short portion 37 of transport rollers 4 does not have tablet threads 36 disposed thereon and hence, this last section 37 is smooth before the tablets 29 exit transport roller 4, 5, 30-32. Smooth section 37 is there to stabilize the discharging tablets 29 so as to increase the accuracy of drop of round tablets 29 for detection and counting. Capsule tablets 28 do not roll so there is no requirement for the use of tablet threads 36 and therefore the angle of smooth transport rollers 4, 30 angle can be greater than with round tablets 29. Normally for capsule tablets 28, the angle of roller module 20 and hence transport rollers 4 and 30 is increased to a point just before tablets 28 start to slide on their own due to gravity with rollers 4, 30 stopped, generally known as the angle of repose.

Figure 8:
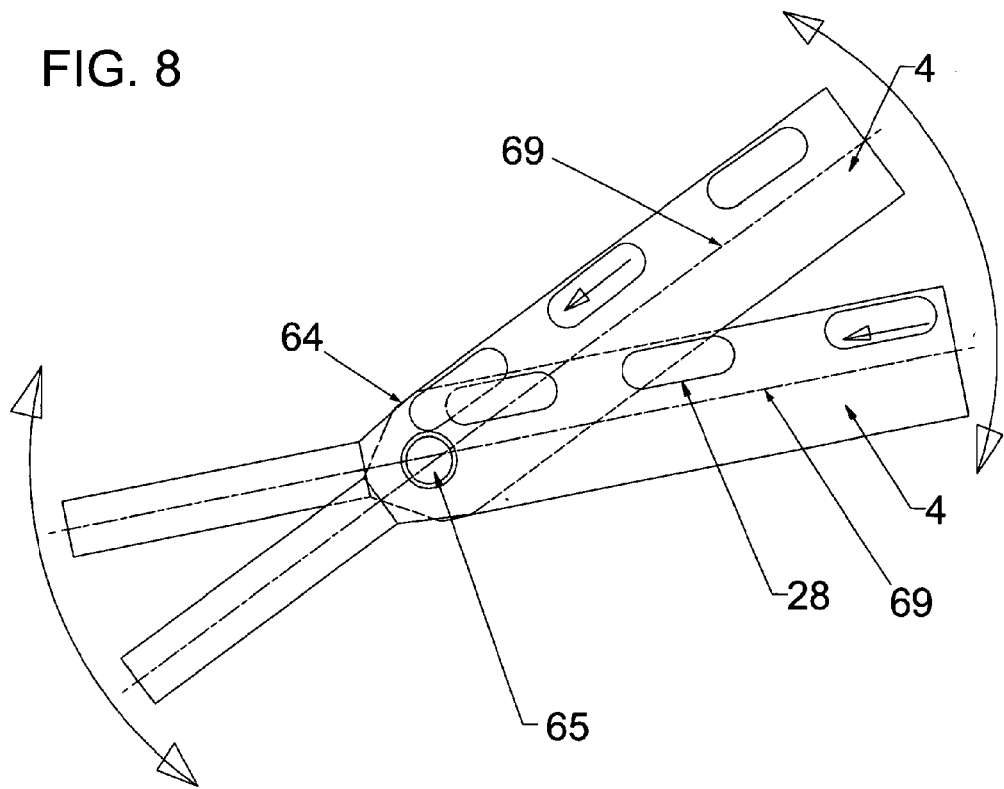
FIG. 8 shows the angle pivot location of the roller module relative to the feed and transport rollers.

FIG. 8 shows pivot 65 of roller module 20 relative to transport rollers 4, 5, 30-32. Pivot 65 is on the centerline 69 of transport rollers 4, 5, 30-32 and exactly at exit drop point 64. By having pivot 65 in this location, the discharge height location from rollers 4, 5, 30-32 will always remain the same though roller module 20 may be disposed at the various angles as discussed above.

Figure 9A:
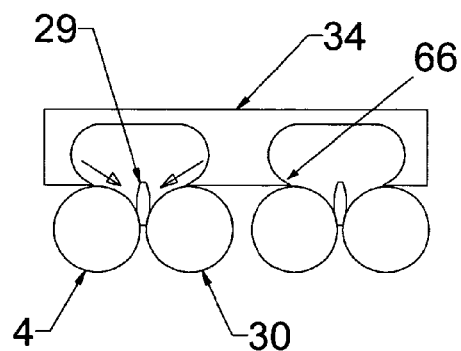
FIGS. 9 A, B are end plan views of the rollers showing different tablet guide configurations.

FIG. 9A shows an end cross-section view of transport rollers 4 and 30. Adjacent and overlapping at least a portion of each of rollers 4, 30 is a tablet side guide 33, side guide 33 disposed between each set of transport rollers 4 and 30 when rollers 4, 30 are arranged in side by side relationship as FIG. 18D. Side guide 33 has a slope 66 to prevent any tablets 29 from collecting on it and due to gravity, helps push any "piggy backed" tablets 29 downwards into the centre roll gap 39. Tablet side guide 33 covers at least one half of the length of transport rollers 4 and 30, from exit port 58 of hopper 1 without presenting any horizontal surface between rollers 4, 30, thus preventing any tablets 29 from collecting instead of travelling along rollers 4, 30. Tablet side guide 33 is also used to cover an empty space between sets of transport rollers 4 and 30.

Figure 9B:
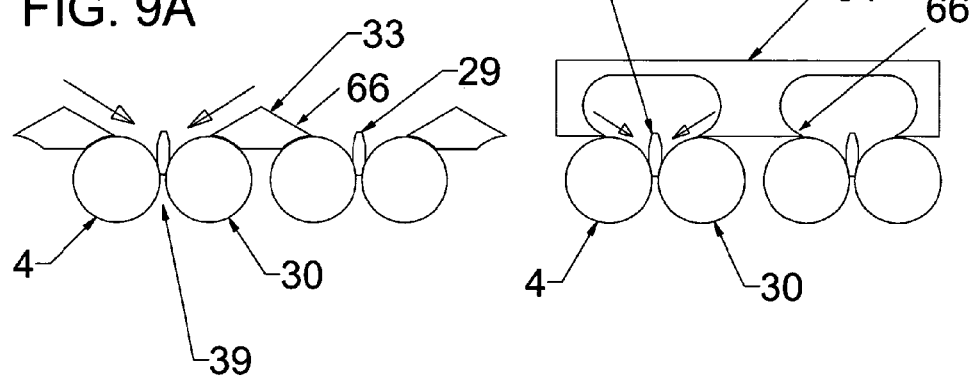

FIG. 9B shows a one-piece version of tablet side guide 33 comprising sloped surfaces 66 formed within a top guide cover 34. Tablet top guide cover 34 acts like a tablet side guide 33 and a cover over tablets 29 all in one, thus guiding tablets 29 and protecting tablets 29 from the environment. Top guide cover 34 could be transparent and may be made to cover many transport roller assemblies 20 at once.

Figure 10A:
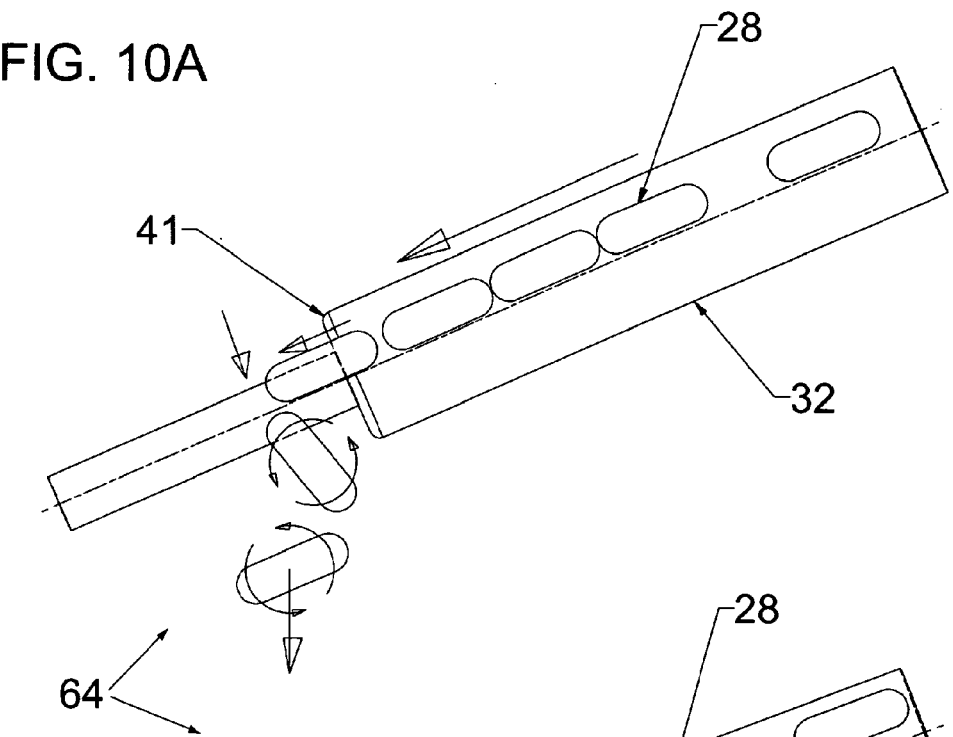
FIGS. 10 A, B show capsule shaped tablet orientation while being discharged off the exit drop point of square end and chamfer end feed and transport rollers, respectively.
Figure 10B:
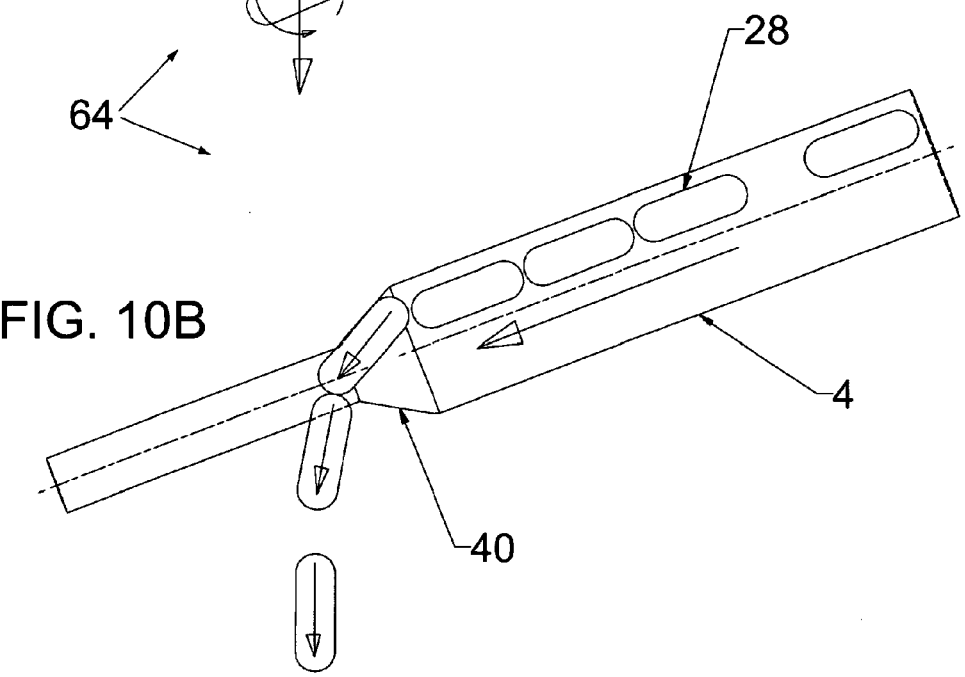
Figure 22A:
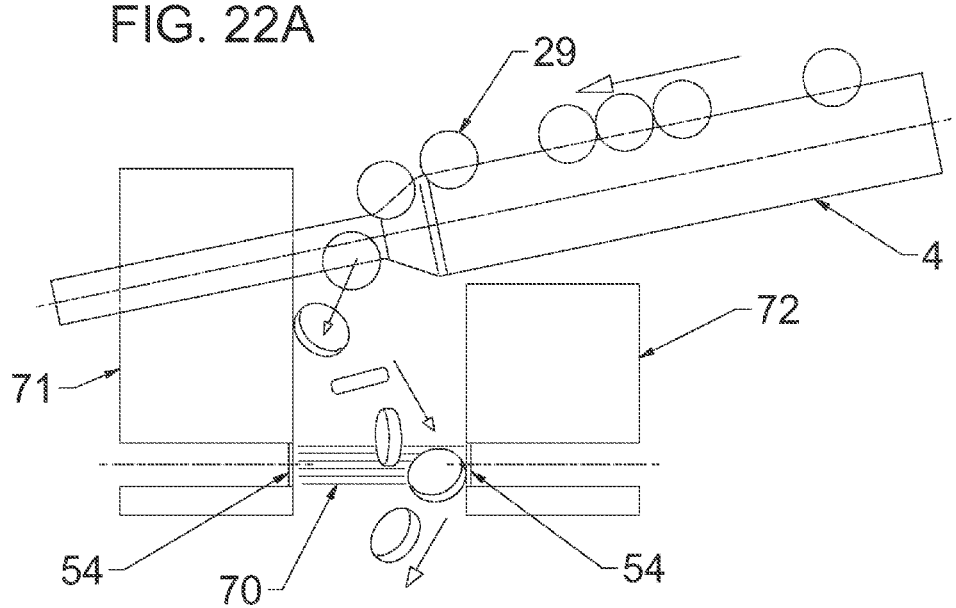
FIG. 22 A is a plan view of a portion of a sorting and counting assembly shown dropping round objects against a planar chute wall wherein the tablets drop randomly through a product count sensor.
Figure 22B:
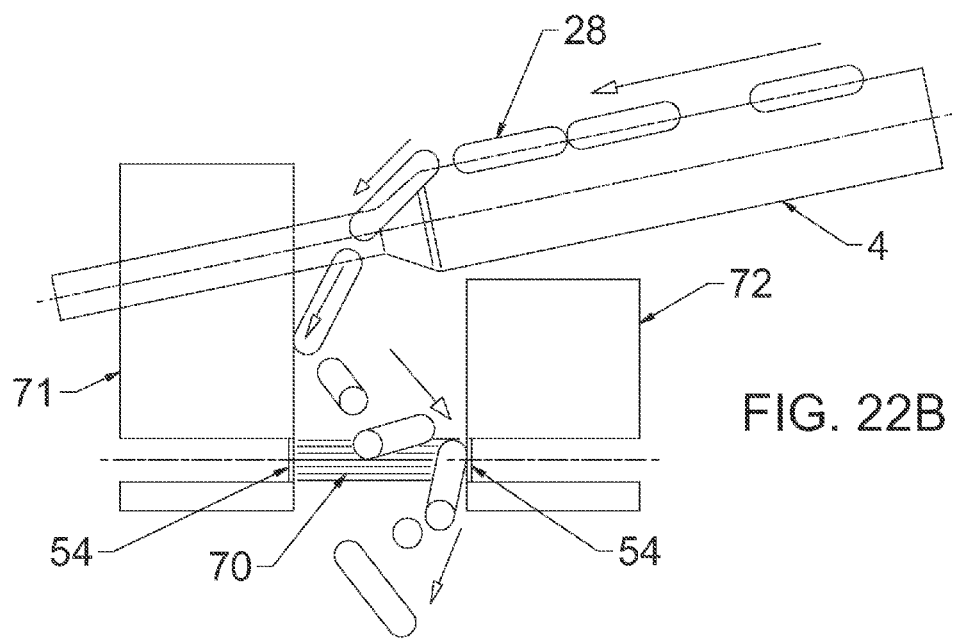

FIG. 10A shows how capsule tablets 28 exit a square shaped end 41 at exit point 64 of a smooth transport roller 32, transport roller 32 differing from transport roller 4 by this square end 41. Elongated capsule tablets 28 exiting square end 41 of rollers 4, 5 will exit at different orientations as the center of gravity of each tablet 28 passes blunt end 41 causing capsule tablets 28 to tumble when discharging from exit point 64. This tablet flipping action causes capsule tablet 28 to be unstable and can increase the difficulties for the product count sensor 54 to distinguish between different tablets 101 thus likely rejecting and gating these spinning tablets 28 as they are falling and bouncing downwardly toward and into sensor field 70 established by product count sensors 54 as shown in FIG. 21. Therefore, in the instant invention, a roller chamfer 40 is used to best advantage for capsule shaped tablets 28. Accordingly, FIG. 10B shows capsule shaped tablet 28 exiting chamfer shaped end 40 at exit point 64 of a transport roller 4 therefore gradually directing the flow direction of capsule tablets 28. Here capsule tablets 28 do not just drop off exit point 64 of transport roller 4, but are directed as shown into a substantially continuous stream as established between transport rollers 4, 30 during the transport of tablets 28 along the length thereof. As can be appreciated by observing FIG. 10B, tablets 28 are oriented in a particular aspect and retain that aspect upon dropping from exit point 64 thus permitting extremely accurate detection and counting by tablet count sensors 54. However, it has been found that the orderly dropping action provided by roller chamfer 40 is disrupted in prior art sorting machines as these prior art machines are provided with a discharge chute having straight walled front sensor block 71 and a straight walled rear sensor block 72 as shown in FIG. 22B. Thus, capsule tablets 28 are caused to fall against the straight wall of straight walled front sensor block 71 and the flipping action of capsule tablets 28 is again regenerated as capsule tablets 28 fall toward sensor field 70. Some capsule tablets 28 may fall freely and most impact the straight wall, therefore increasing the likelihood that two or more capsule tablets 28 will be in sensor field 70 at the same time as shown in FIG. 22B and thus one or more of capsule tablets 28 do not get counted. The discharge speed, and/or the mass of capsule tablets 28 also alter the exit trajectory and may cause some capsule tablets 28 to bounce against the straight wall of straight walled front sensor block 71 rebounding against a straight wall of straight walled rear sensor block 72 further impacting count accuracy. Bouncing against straight walls may cause damage to capsule tablets 28, including fragmentation and most certainly results in dust being created by the frictional engagement against these straight walls. Fragments created by the bouncing action will pass into sensor field 70 and thus may be counted as a complete capsule tablet 28 rather than being rejected, thus causing an inaccurate count in a container being filled. Bouncing against the straight walls also causes deceleration of the capsule tablets 28, again greatly increasing the likelihood that multiple capsule tablets 28 may be in sensor field 70 simultaneously and therefore causing an inaccurate count. Furthermore, where the flow of capsule tablets 28 is split by count sensor 54, tumbling capsule tablets 28 and/or fragments may be misdirected into an incorrect container and the count in one container may be high while another container count is low. Of course, since multiple tumbling capsule tablets 28 may not be counted there is the possibility that all containers being filled may be high.

Figure 11A:
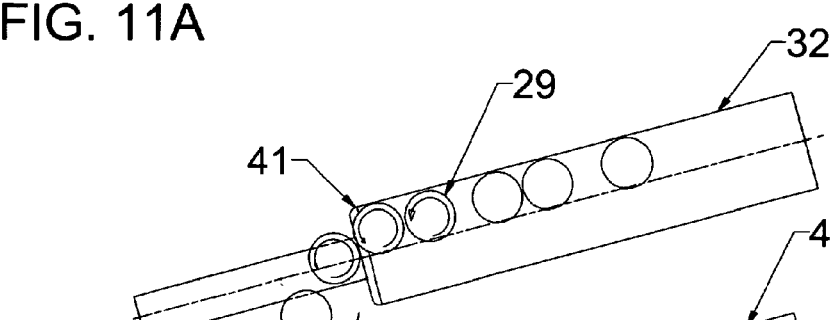
FIGS. 11A, B show typical round tablet orientation while being discharged off the exit drop point of square end and chamfer end feed and transport rollers, respectively.
Figure 11B:
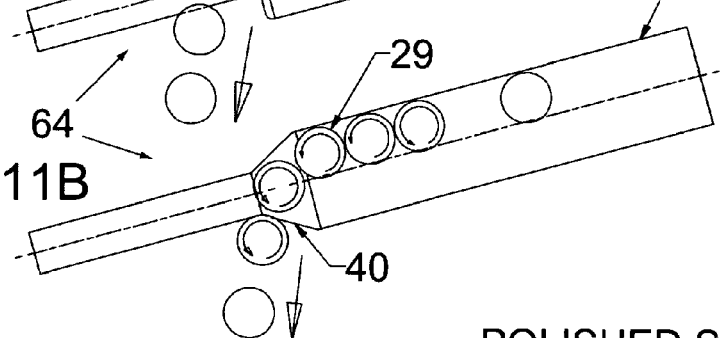

In contrast to the tumbling action of capsule shaped tablets 28 shown in FIG. 10A and the preferred orderly stream shown in FIG. 10B, FIG. 11A shows round shaped tablets 29 exiting cleanly and in a straight orientation from square shaped end 41 at exit point 64 of smooth transport roller 32. Similarly, FIG. 11B shows round shaped tablets 29 exiting cleanly, stable, and in a straight orientation from chamfer shaped end 40 at exit point 64 of a transport roller 4. As round tablets 29 exit from exit drop point 64 in the same orientation as established upon rollers 4, 5, 30-32, detection and counting of round tablets 29 is easily and accurately accomplished. It has also been found that the orderly dropping action of round tablets 29 is disrupted in prior art sorting machines by the straight walled front sensor block 71 and a straight walled rear sensor block 72 discharge chute as shown in FIG. 22A. As with capsule tablets 28, round tablets 29 also fall against the straight wall of straight walled front sensor block 71 and thus round tablets 29 also flip as round tablets 29 fall toward sensor field 70. Some round tablets 29 may fall freely but most impact the straight wall wherein some rebound against a straight wall of rear sensor block 72 and some tip into a flat orientation therefore increasing the likelihood that two or more round tablets 29 will be in sensor field 70 at the same time as shown in FIG. 22A and thus one or more of round tablets 29 do not get counted. Likewise, as discharge speed of round tablets 29 and/or the mass of round tablets 29 is changed, the exit trajectory is altered further impacting count accuracy. Bouncing against straight walls may cause damage to round tablets 29, including fragmentation and most certainly results in dust being created by the frictional engagement against these straight walls. Fragments created by the bouncing action will pass into sensor field 70 and thus may be counted as a complete round tablet 29 rather than being rejected, thus causing an inaccurate count in a container being filled. Bouncing against the straight walls also causes deceleration of the round tablets 29, again greatly increasing the likelihood that multiple round tablets 29 may be in sensor field 70 simultaneously and therefore causing an inaccurate count. Furthermore, where the flow of round tablets 29 is split by count sensor 54, tumbling round tablets 29 and/or fragments may be misdirected into an incorrect container and the count in one container may be high while another container count is low. Of course, since multiple tumbling round tablets 29 may not be counted there is the possibility that all containers being filled may be high.

Figure 23A:
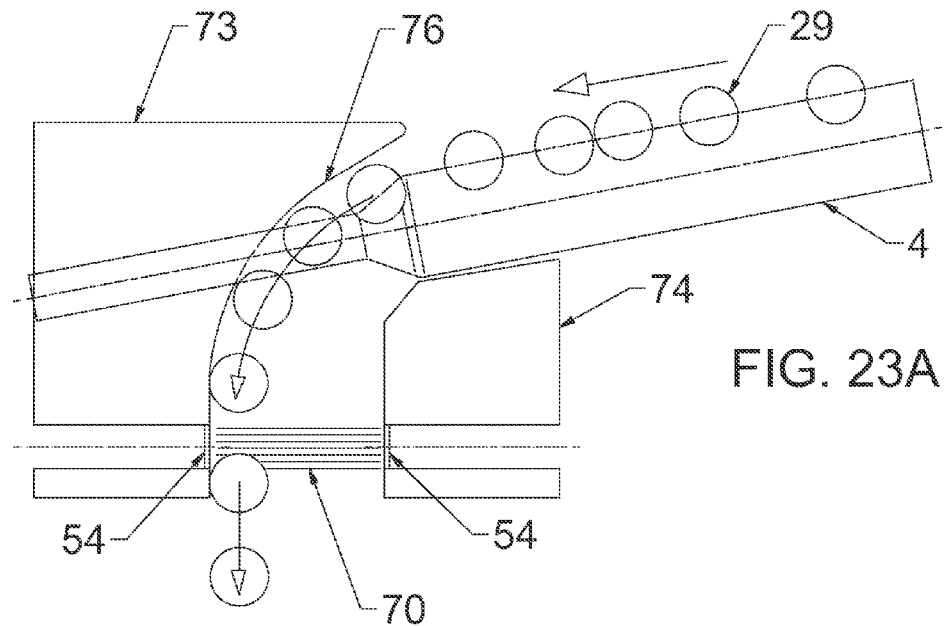
FIG. 23 A is a plan view of a portion of a sorting and counting assembly having a curved chute wall guiding round objects in an orderly fashion toward and through a product count sensor.
Figure 23B:
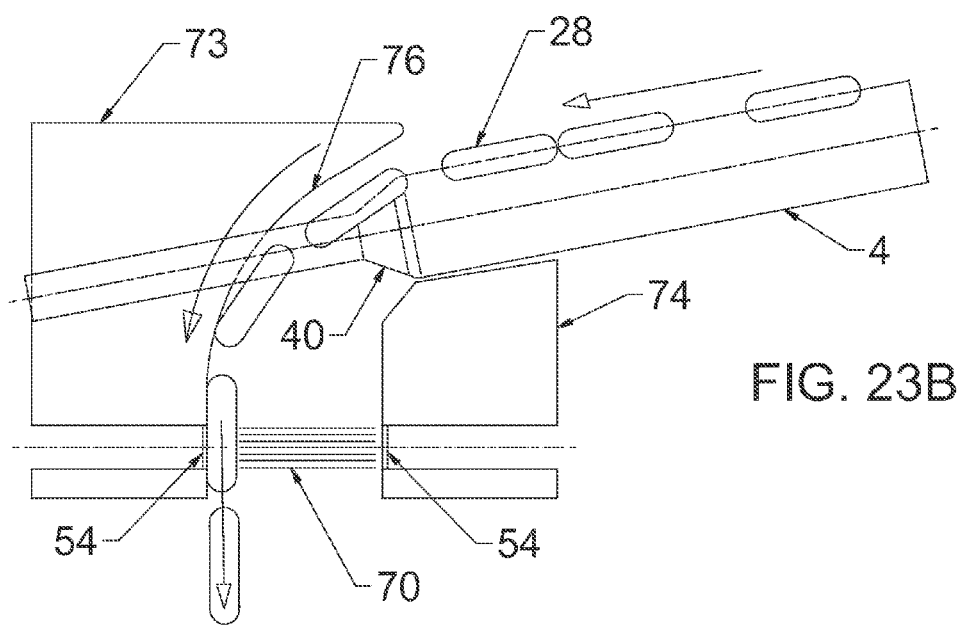

Counting accuracy is greatly improved in the instant invention by providing roller chamfer 40 on feed and transport rollers 4, 5 of FIGS. 10B and 11B or sort and transport rolls 79, 80 and by providing a curved wall 76 on a discharge side of a radiused tablet guide block 73 as shown in FIGS. 23A and 23B such that both capsule tablets 28 and round tablets 29 engage curved wall 76 in a tangential fashion thus directing the previously established orderly stream of tablets 28 or 29 toward and through sensor field 70. Since tablets 28 or 29 follow along curved wall 76, flipping is eliminated and thus only one tablet 28 or 29 is presented to sensor field 70 at a time and therefore product count sensors 54 provide exact counting of tablets 28 or 29. Curved wall 76 has a fixed radius centered on pivot 65 and thus radiused tablet guide block 73 remains fixed in position, tablet sensors 54 remain fixed and discharge chute 19 remains vertically oriented.

Figure 12A:
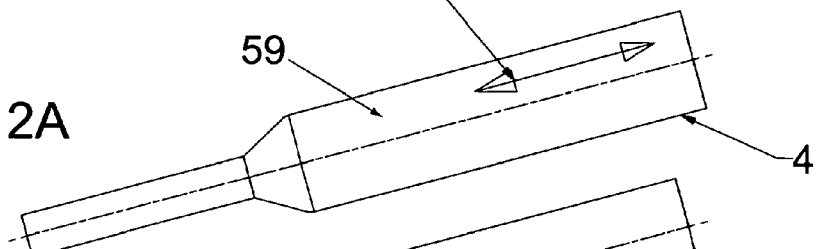
FIGS. 12 A, B indicates different surface finishes for the transport rollers of FIG. 3 A.
Figure 12B:
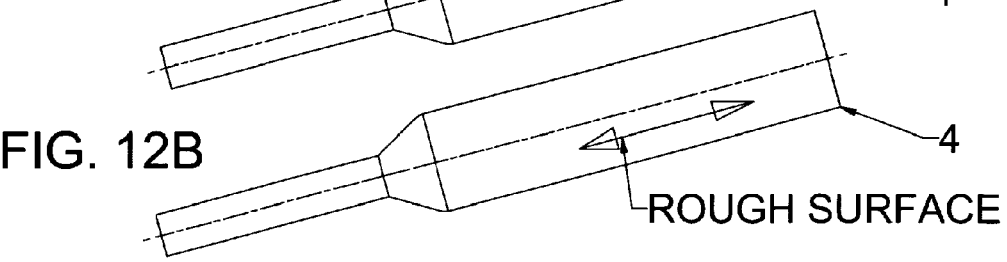
Figure 12C:
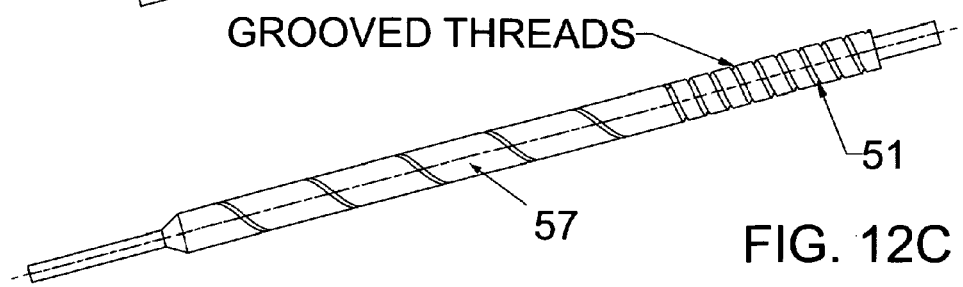

FIG. 12A shows preferred surface 59 for transport roller 4, surface 59 a smooth polished surface. It is within the scope of this invention to provide for other surfaces 57, 59 for rollers 4, 5 and 30-32, for instance, FIG. 12B shows a typical transport roller 4 with a rough surface finish for surface 57, 59 which may optimize the lifting and rolling function on the side of some smooth surface tablets 101. It is also within the scope of this invention to provide for a turned finish for surfaces 57, 59, though it has been found that a smooth polished surface is best for pressed granular tablets 101. It is further within the scope of this invention to provide for grooved surface for surface 57 of roller 5 as shown in FIG. 12C where a typical transport roller similar to the transport roller 5 shown in FIG. 3B, but with a threaded groove 51 machined into roller 4, 30 instead of a thread 36 protruding outwardly.

Figures 13A, 13B, 13C:
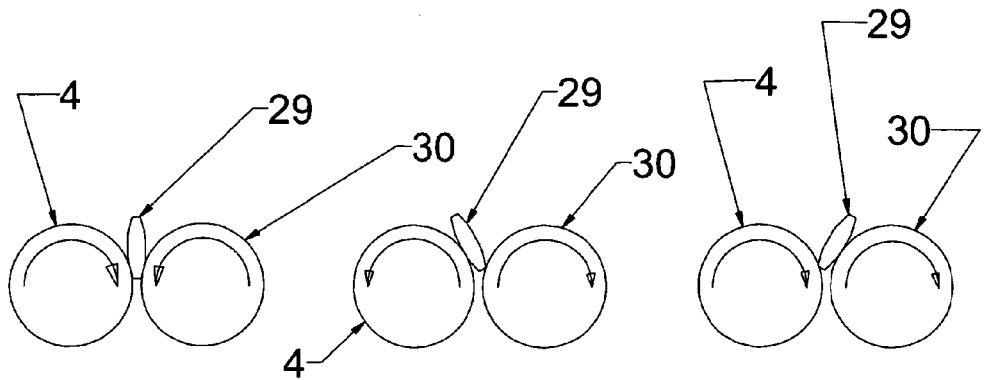
FIGS. 13 A, B, C, D show different end views of typical round tablets and how they sit on the transport rollers having different rotational directions.

FIGS. 13A, B, C, and D show different transport roller rotating configurations and how the rotation affects round tablet 29 placements on smooth transport rollers 4 and 30. Referring first to FIG. 13A, transport rollers 4 and 30 are rotating inwardly and downwardly with respect to each other, typical round shape tablet 29 sitting between rollers 4, 30 wherein the action of transport rollers 4 and 30 is pulling round tablet 29 downwardly resulting in a more vertical orientation for round tablet 29. In this vertical orientation, there is more friction and load on round tablets 29. In contrast, FIG. 13B shows transport rollers 4 and 30 rotating outwardly and upwardly with respect to each other resulting in round tablet 29 tending to tip toward one of transport rollers 4, 30. This set up lifts tablet 29 and reduces the friction and stress on it and hence, round tablet 29 is freer to move and to roll forward. FIG. 13B is a preferred direction of rotation for rollers 4, 30 which is especially true with fluted rollers 5, 31 as the outwardly and upwardly counter rotation cooperates with thread 36 to advance round tablets 29 along the length thereof. It is possible within the scope of this invention to provide for rotation of both rollers 4, 30 in the same direction. Referring now to FIG. 13C, transport rollers 4 and 30 are shown turning clockwise in the same direction which causes capsule tablets 28 to roll and could cause round shaped tablets 29 to flip. This same direction rotation set up results in tablets 101 being less stable and could cause flipping or rolling at the point of exit 64. Though rolls 4, 30 are shown to be turning clockwise in FIG. 3C, counterclockwise rotation is also within the scope of this invention. Additionally, it is fully within the scope of this invention to provide for smooth roll 4 to be larger or smaller in diameter than an adjacent smooth roll 30 or fluted roll 5 to further assist in orientation of tablets 28, 29. Prime mover 12 may also be modulated such that rollers 4, 5, 30-32 are rapidly rotated and stopped imparting a rotational vibration thereto to facilitate movement of tablets 28, 29. Thus, rollers 4, 5, 30-32 may be different in diameter, rotated at different constant angles of rotation, and/or rotationally oscillated.

Figure 13D:
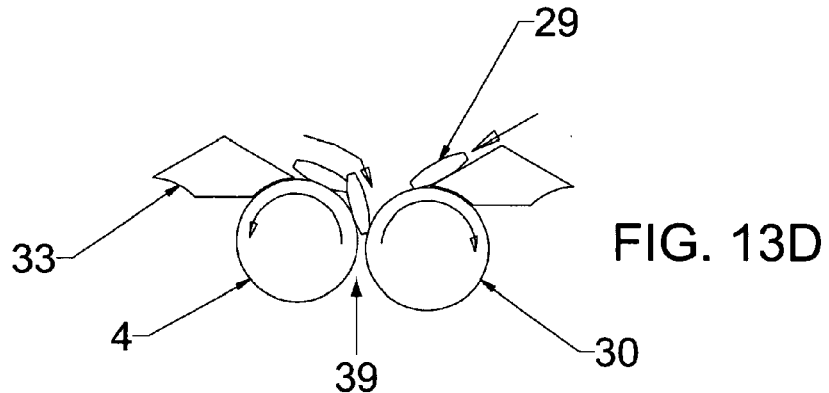

In FIG. 13D, round shaped tablets 29 acting as explained in FIG. 9A with typical tablet side guides 33 will slide into gap 39 by action of side guides 33 and counter rotation of rolls 4, 30. Some round tablets 29 may tilt toward one roll 4, 30 while others may tilt toward the opposed roll 30, 4. Where a round tablet 29 tends to ride high on a roll 4, 30 such as shown on roll 30, round tablet 29 will rotate on its axis by action of roll 30 along side guide 33 and move inwardly toward gap 39. Likewise, a round tablet 29 tending to ride under another round tablet 29 as on roll 4, the upper round tablet 29 will also rotate on its axis, and by rotation of roll 4 and retention of side guide 33 will tend to push this upper round tablet 29 downwardly into gap 39.

Figures 14A, 14B:
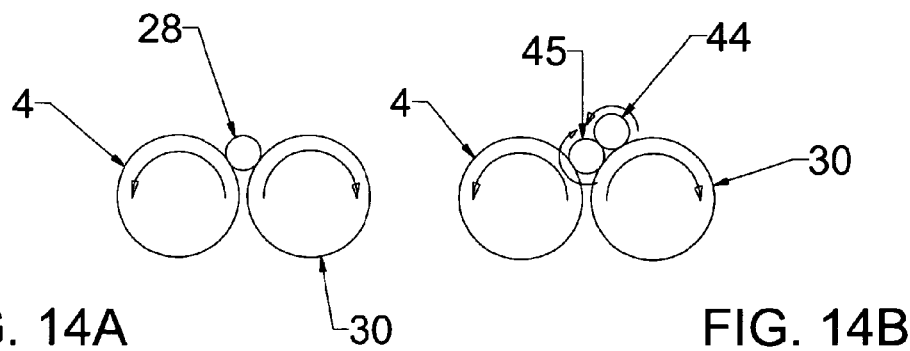
FIGS. 14 A, B show an end view of typical capsule shaped tablets and how they sit on the transport rollers having different rotational directions.

FIG. 14A shows that a single capsule shaped tablet 28 between smooth transport rollers 4 and 30 does not rotate since both transport rollers 4 and 30 are turning in opposite directions upwardly and outwardly with respect to each other. It is necessary then to angle roller module 20 at a sufficient angle to allow capsule shaped tablets 28 to move along the length of rolls 4, 30 to exit point 64. Usually, capsule shaped tablets 28 will move in single file along the length of rolls 4, 30, however, in certain instances as shown in FIG. 14B, two capsule tablets 28 are "piggy backed" together. In this orientation, a bottom tablet 45 is sitting in between transport rollers 4 and 30, and because of "piggy backed" tablet 44, bottom tablet 45 is rolling in one direction, usually opposite in direction to the roll 4, 30 against which tablet 45 has the greatest force. As shown in FIG. 14B, that higher force caused by "piggy backed" tablet 44 is against roll 4 and hence bottom tablet 45 rotates opposite to roll 4. Since "piggy backed" tablet 44 has the bulk of its weight against roll 30, "piggy backed" tablet 44 is rotating in a direction opposite to roll 30 and opposite to bottom tablet 45. This rolling action dislodges upper tablet 44 and makes it unstable causing upper tablet 44 to work its way downwards to an empty space between other tablets 28 on transport rollers 4 and 30.

Figure 15:
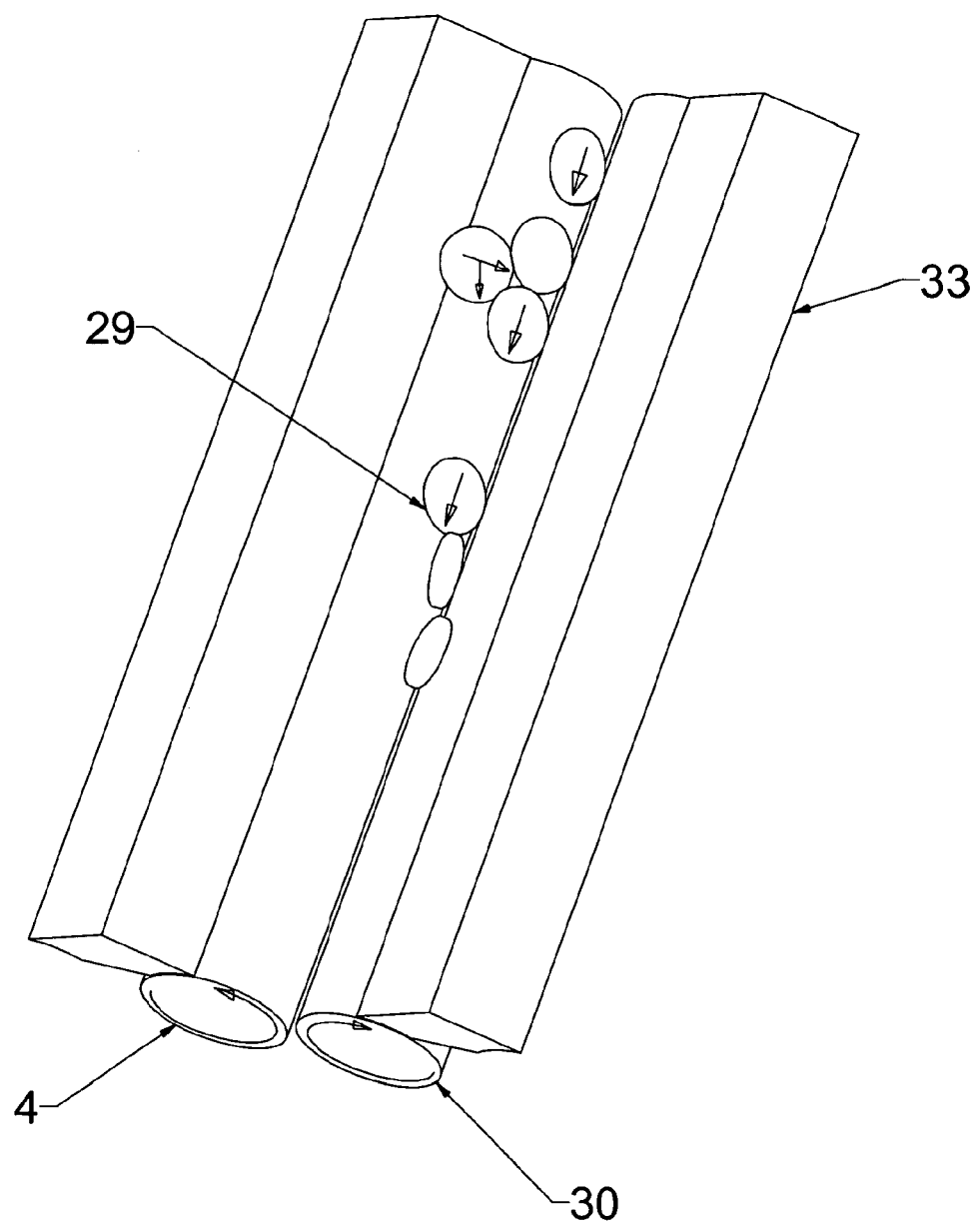
FIG. 15 shows an upper right partial isometric view of the transport rollers of FIG. 3 A with typical round tablets being fed along the length of the rollers.

FIG. 15 shows a typical isometric view of a section of transport rollers 4 and 30. Round shaped tablets 29 align themselves in a single row due to rotation and gravity. Any "piggy backed" tablets 29 will pry, find, or create a gap in between other round tablets 29 in the row of tablets 29 disposed in gap 39 between rolls 4, 30.

Figure 16A:
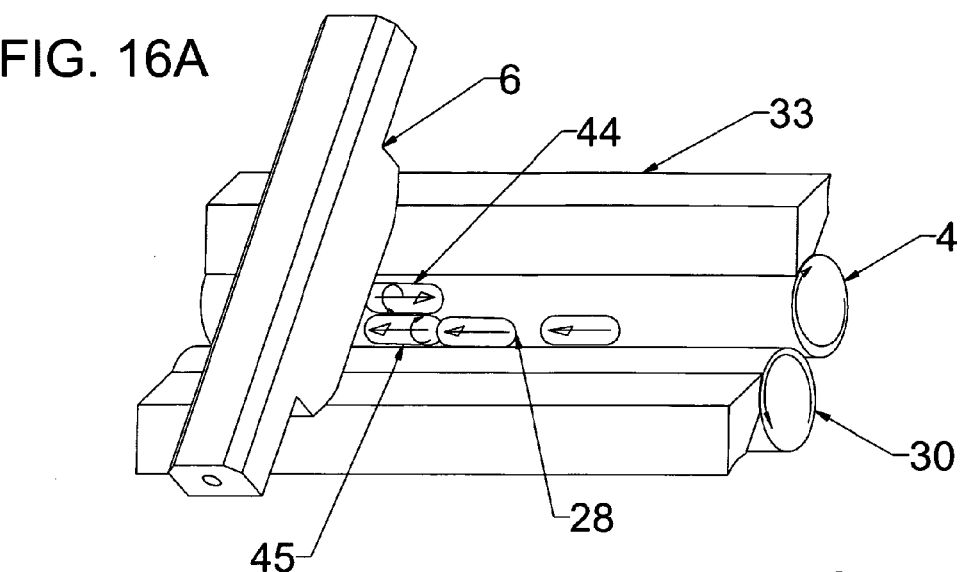
FIGS. 16 A, B show the orientation of "piggybacked" capsule shaped tablets and how they are dislodged by a tablet deflector.
FIG. 16F shows the capsule shaped tablet of FIG. 16 E deflected by the tablet deflector into an orientation along the length of the feed and transport rollers between the hopper outlet and the tablet deflector.
Figure 16B:
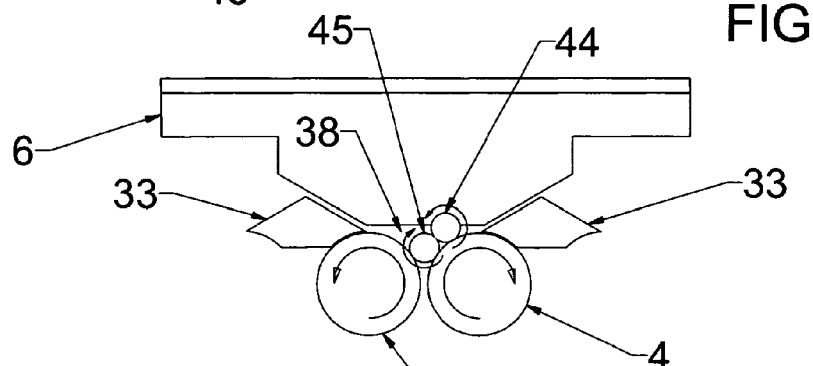
Figure 16C:
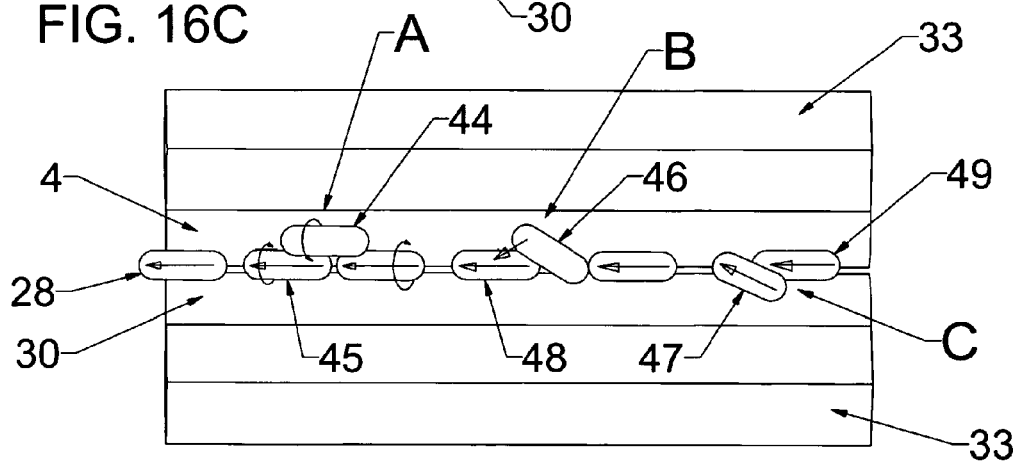

FIG. 16A shows the function of tablet deflector 6 and how tablet deflector 6 allows only a single stream of capsule tablets 28 to pass under it. Tablet deflector 6 stops "piggybacked" or doubled up rows of tablets 28. Where "piggybacked" tablets 28 occur, the upper tablet 44 will rotate as shown due to the rotating transport roller 4 as explained above with reference to FIG. 14B while tablet 45 under upper tablet 44 will be rotating in the opposite direction. This rotation reduces the friction between tablets 44, 45 and allows lower tablet 45 to continue to pass under the tablet deflector 6. Upper tablet 44 will stay in this position until a space occurs between the lower flow of tablets 45. FIG. 16B shows an end cross-section view of FIG. 16A and the respective rotations of capsules shaped tablets 44 and 45, rolls 4, 30 and a gap 38 under tablet deflector 6. FIG. 16C shows a top view of a typical capsule shaped tablet 28 grouping between two transport rollers 4 and 30 prior to encountering tablet deflector 6. Arrangement "A" shows a typical "piggy backed" tablet 44 which will rotate between each other in opposite directions as explained above. Also upper tablet 44 will normally travel along the top of lower tablets 45 until tablet 44 finds a space in flow of tablet 45. Since there is less friction for upper tablet 44 against bottom tablet 45 than the friction tablet 45 has against rolls 4, 30, upper tablet 44 will travel faster than bottom tablet 45. Arrangement "B" shows a typical wedge in tablet 46. Front tablet 48 in front of wedge tablet 46 will continue to advance forward until wedge tablet 46 drops into tablet flow between tablet 48 and any trailing tablet. In some instances, it is possible for a partially "piggy backed" tablet to advance ahead of a lower tablet. For instance, in arrangement "C," lead-in wedge tablet 47 will slide ahead of trailing tablet 49 and drop in place in front of tablet 49.

Figure 16D:
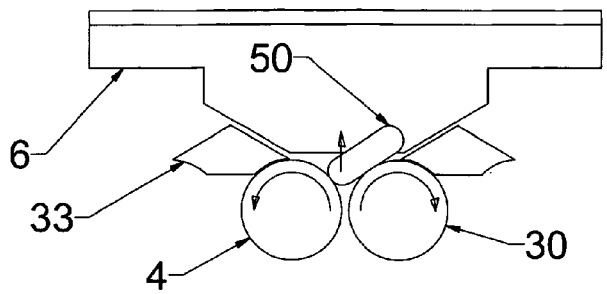
Figure 16E:
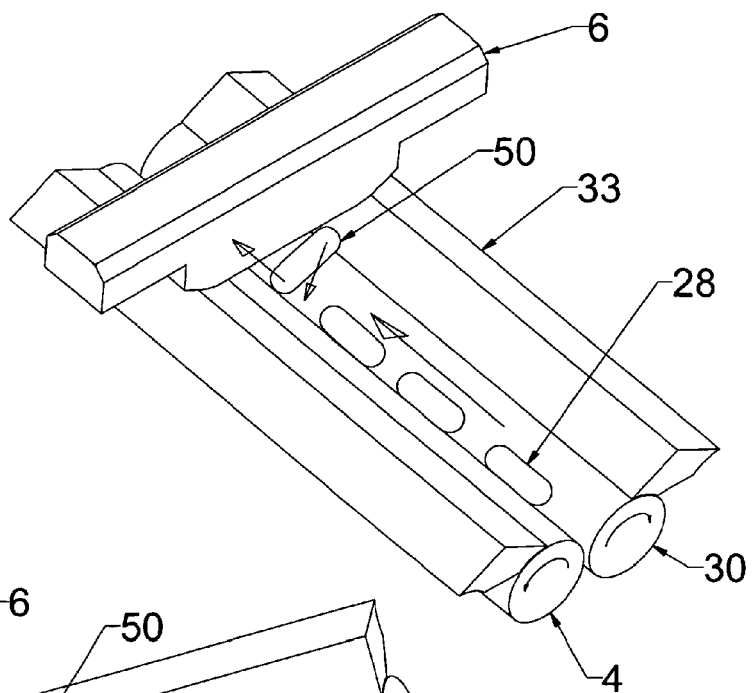
Figure 16F:
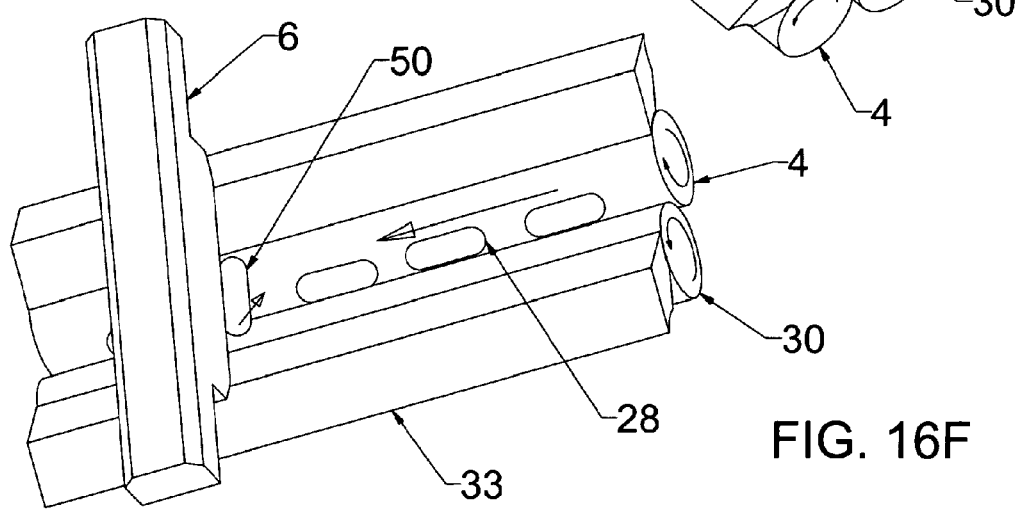

FIGS. 16D, E, and F show a capsule shaped tablet 50 horizontally across both rollers 4, 30 and stopped by tablet deflector 6 as transport rollers 4 and 30 continue to rotate. One end of capsule shaped tablet 50 will drop down between two rollers 4 and 30, and then rotate as shown in FIG. 16E.

Figure 17A:
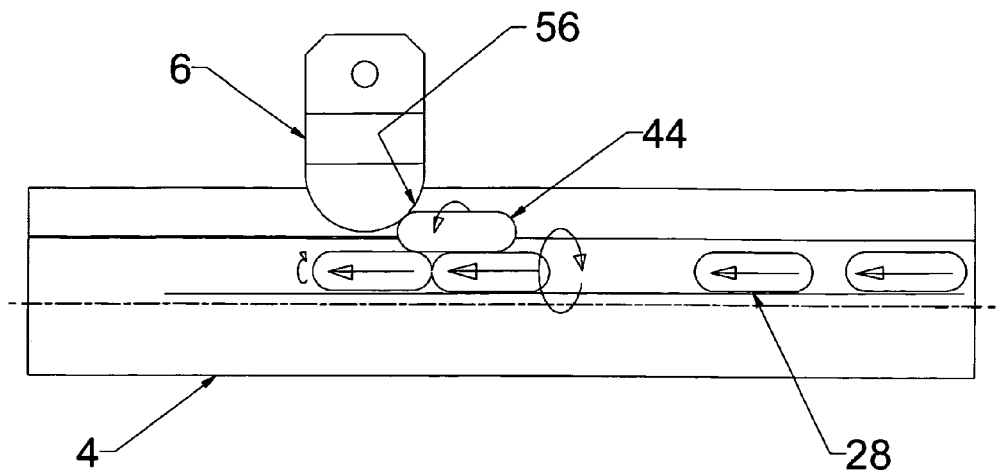
FIG. 17 A shows a side view of the tablet deflector stopping a "piggy backed" tablet.
Figure 17B:
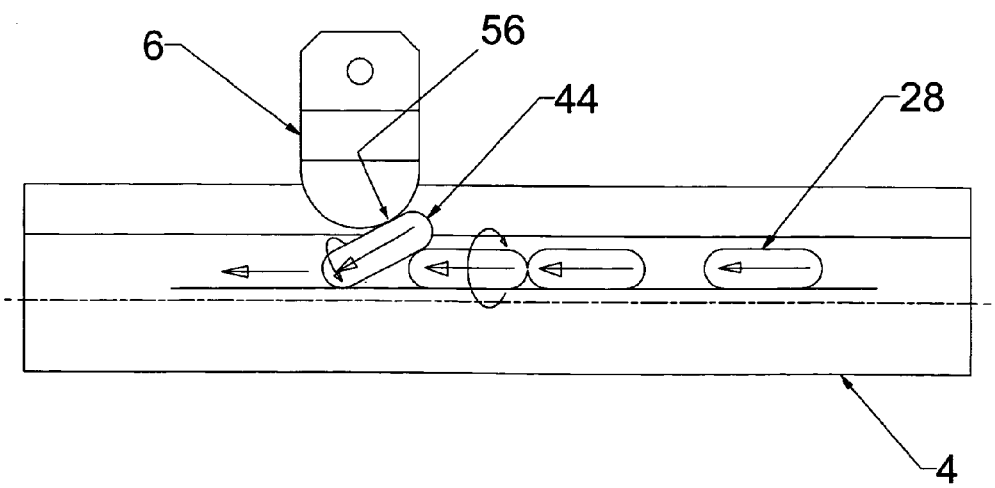

FIG. 17A shows a side view of tablet deflector 6 with roll 30 removed for clarity. Lower leading edge 56 of tablet deflector 6 has a generous radius thereupon in order to deflect or guide tablets 101 downwards and under tablet deflector 6 without jamming the tablet flow. This radius acts for "piggy-backed" tablets 44 as it stops upper tablet 44 from travelling forward. FIG. 17B shows a "piggybacked" tablet 44 on an angle in front of a second tablet 28. This wedge tablet 44 will be directed under tablet guide 6 and any trailing tablet will wait until wedge tablet 44 passes through. Wedged 44 tablet will also rotate due to its contact with one roller 4, 30. The tablet rolling action will help prevent tablet 44 from jamming and thus tablet 44 will wiggle its way under tablet deflector 6. This tablet deflector 6 could be made out of a flexible material such as rubber or spring loaded in order to lessen the possibility of jamming. Also the height of tablet deflector 6 above rolls 4, 30 can be raised or lowered to increase or to decrease the gap between deflector 4 and transport rollers 4, 30.

Figures 18A, 18B:
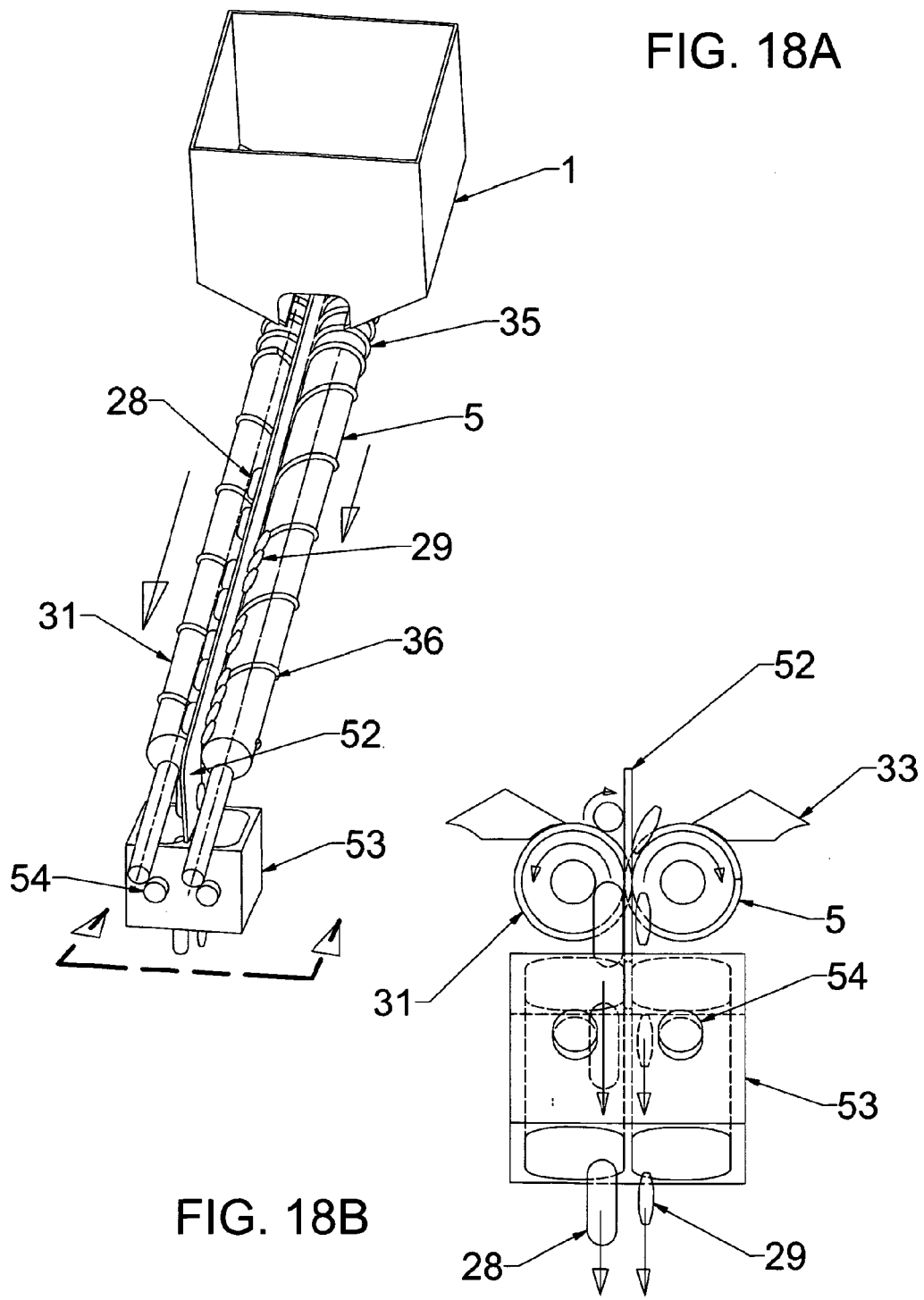
FIG. 18 A shows an upper right end isometric view of FIG. 3C, but with a fixed lane divider added between the rollers for dividing tablets fed from a hopper into two streams.
Figure 18C:
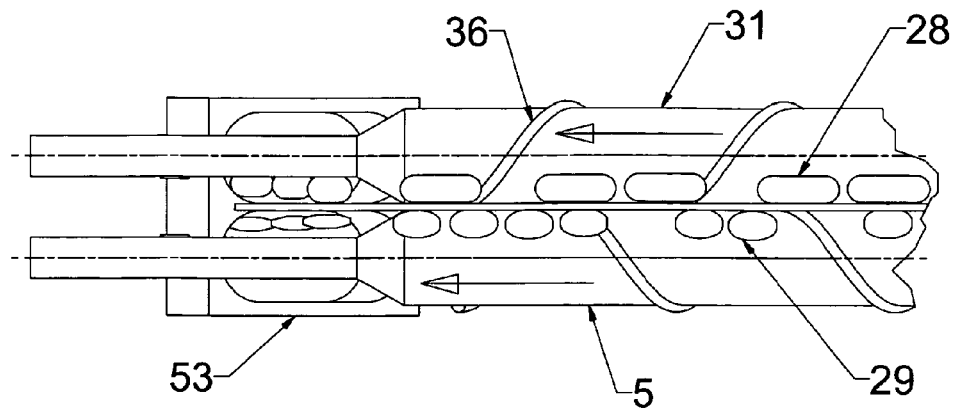

An alternate roller module 20 is shown in FIG. 18A wherein a single lane divider 52 along the centre line between transport rollers 5 and 31. Lane divider 52 travels the entire length of transport rollers 5 and 31 from inside product hopper 1 past tablet exit point 64 of transport rollers 5 and 31. Lane divider 52 thus divides tablets 101 from hopper 1 into two separate streams for separate counting and capturing through separate tablet chutes 53 and past individual tablet counters 54. FIG. 18B shows an end view of FIG. 18A where transport rollers 5 and 31 are shown rotating in directions opposite to each other, although they could be rotated in any direction desired. Lane divider 52 is shown standing vertical and on the centre line between transport rollers 5 and 31. Transport rollers 5 and 31 have tablet feed threads 35 disposed under hopper 1 and tablet threads 36 along the entire length thereof similar to FIG. 3C. A capsule shaped tablet 28 will tend to rotate and align parallel to the lane divider 52 and transport rollers 5 and 31. Round shaped tablets 29 will remain flat against transport roller 5 and 31 as shown. Tablet side guides 33 act in the same manner as shown in FIG. 9A. FIG. 18C shows a top view of FIG. 18A. Tablets 28 and 29 are being divided into two lanes by the lane divider 52. Tablets 28 and 29 are propelled forward by transport rollers 5 and 31 and threads 36. Each lane of tablets 28 and 29 are independent of each other and when tablets 28, 29 exit transport rollers 5 and 31, they will drop down two tablet chutes 53, past each separate tablet count sensors 54.

Figure 18D:
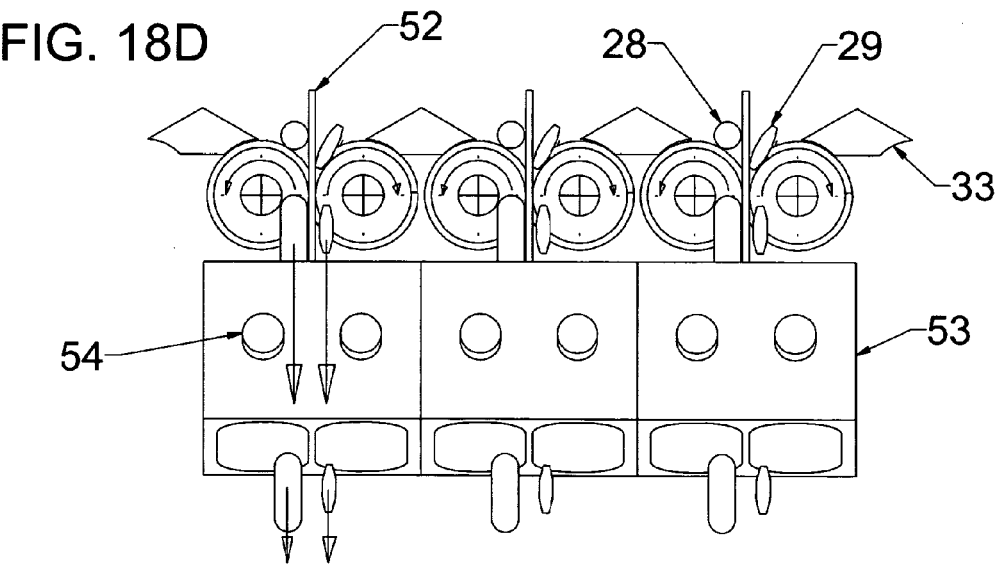

FIG. 18D shows a plurality of roller assemblies 20 of FIG. 18B in side by side relationship but separated, each roller module 20 with it's own lane divider 52. The tablets will act in the same manner as in FIG. 18B.

Figure 18E:
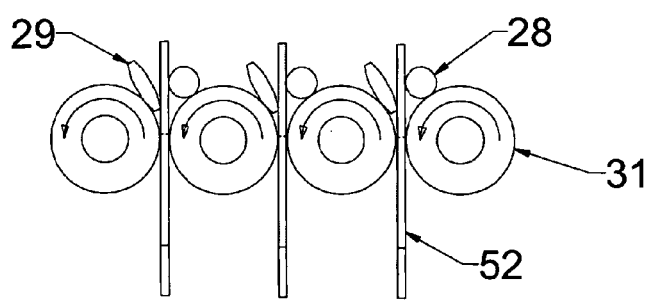

In yet another embodiment as shown in FIG. 18E, several transport rollers 31 are rotating independently and parallel to each other, rollers 31 divided with lane dividers 52, however, lane dividers 52 of this alternate invention pass through the gap between rollers. Transport rollers 31 are mounted closely together and are rotating in the same direction.

A further enhancement to roller module assembly 20 of the instant invention is shown in FIGS. 24 A-E wherein a set of feed rolls 77, 78 are spaced above sort rolls 79-80. Sort and transport rolls 79, 80 are provided with a smooth portion disposed substantially under feed rolls 77, 78 and may further be provided with thread 36 extending from the smooth portion to a tapered end 41 thereof. Referring specifically to FIG. 24A, feed rolls 77, 78 preferably are geared together to rotate in opposite hand as shown in FIG. 24C and are driven independently from sort rolls 79, 80. Though feed rolls 77, 78 are preferably geared together, feed rolls 77, 78 may be driven independently by separate prime movers to provide for more positive feeding of tablets 28 or 29 from hopper 1. As feed rolls 77, 78 are preferably geared together, feed rolls 77, 78 rotate upwards from the inside thus lifting up tablets 28 or 29 causing a floating effect reducing the possibility of jamming of tablets 28 or 29 together or the damaging of tablets 28 or 29. The speed, acceleration or deceleration of feed rolls 77, 78 may be adjusted for different tablets 28 or 29 or may be adjusted during a particular run of tablets 28 or 29 to ensure a steady flow of tablets 28 or 29 to sort rolls 79, 80. By rapidly starting and stopping feed rolls 77, 78, a vibratory action can be imparted to feed rolls 77, 78 thus helping to dislodge tablets 28 or 29 from hopper 1 and to spread out tablets 28 or 29 along the length of feed rolls 77, 78. Feed rolls 77, 78 are shorter in length than sort rolls 79, 80 such that tablets 28 or 29 are positively driven from hopper 1 and dropped onto sort rolls 79, 80 in order to ensure that a steady stream of tablets 28 or 29 are presented to count sensors 54. In FIGS. 24A and 24C, feed roll 78 is shown as a smooth roll while feed roll 77 has been provided with a thread 35 thereupon, however, it is fully within the scope of this invention to provide a thread 35 upon both rolls 79, 80 or to have no thread 35 upon either roll 79 or 80.

Hopper 1 is provided with a sloped bottom wall 68 at an angle 75 from feed rollers 77, 78 which effectively guides tablets 28 or 29 along bottom wall 68 and onto feed rollers 77, 78 as shown in FIG. 24B. Sloped bottom wall 68 of hopper 1 extends over feed rollers 77, 78 and terminates just above feed thread 35 of feed rolls 77, 78. By guiding tablets 28 or 29 along bottom wall 68, a smooth transition between hopper 1 and feed rolls 77, 78 is created and hopper jamming is prevented. Additionally, tablets 28 or 29 assume a preferred orientation with respect to feed rollers 28 or 29 while moving along bottom wall 68 such that engagement with feed rolls 77, 78 is enhanced and tablets 28 or 29 are positively pulled from hopper 1. Feed rolls 77, 78 are provided with a blunt end 41 to intentionally cause destabilisation of tablets 28 or 29 thus flipping tablets 28 or 29 onto feed rolls 77, 78. Accordingly, separation of tablets 28 or 29 is enhanced and piggybacking of tablets 28 or 29 is reduced.

By having two sets of rolls, feed rolls 77, 78 may be driven at different rotational speeds than sort rolls 79, 80 thus allowing individual control of feeding speeds and sorting speeds. Additionally, either set of rolls 77, 78 or 79, 80 may be vibrated by rapidly altering the rotational speed to enhance dislodging of piggyback tablets 28 or 29. With blunt end 41 provided on feed rolls 77, 78, a drop point is established between feed rolls 77, 78 to dislodge, un-piggyback and/or separate tablets 28 or 29 as tablets 28 or 29 drop onto sort rolls 79, 80. Additionally, since feed rolls 77, 78 are arranged over a smooth portion of sort rolls 79, 80, dust and/or fragments in hopper 1 are allowed to fall freely from feed rolls 77, 78 through sort rolls 79, 80 prior to tablets 28 or 29 being discharged onto sort and transport rolls 79, 80 thus eliminating dust and/or fragments from sort stream. Also, feed rolls 77, 78 may be removed from roller assembly 20 for cleaning or changing to a different set of feed rolls 77, 78 without removing sort and transport rolls 79, 80. Finally, gating of tablets 28, 29 can be accomplished by jogging or controlling the speed of sort and transport rolls 79, 80 while feed rolls 77, 78 continue to feed tablets 28, 29 from hopper 1. Gating of tablets 28, 29 may be automatically controlled by count sensors 54 or may be controlled by an operator.

Referring now to FIGS. 24 D and 24E, thread 35 on feed roll 77 and/or 78 has a square profile which performs the same function as previously stated with regard to the square thread 35 on a combination feed and transport roller 4, 5. Square thread 35 is substantial in height and thus positively pushes tablets 28 or 29 engaged therewith away from hopper 1 and onto sort and transport rolls 79, 80. The pitch of thread 35 is less than the pitch of thread 36 to pull out tablets 28 or 29 from hopper 1 whereafter thread 36 has a greater pitch to spread apart and space tablets 28 or 29 into an orderly stream. Thread 36 of sort and transport roll 79, 80 is shorter in height and narrower in width such that doubled tablets 28 or 29 may easily ride over the thread to find an opening in the orderly stream. Thread 36 is useful to provide a stop to reduce rolling of round tablets 29 and sliding of tablets 28 or 29 along sort and transport roll 79, 80.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

I claim:

1. A roller assembly for a high-speed tablet feeder comprising a pair of feed rollers and a pair of sort and transport rollers, at least one prime mover, a drive plate, at least two end plates, a pair of side plates, at least one tablet guide, a pivot plate, a handle, a stop pin and a hopper, said feed rollers further comprising a pair of gears at a drive plate end thereof and a blunt end opposite said drive plate end, said sort and transport rollers further comprising a pair of gears at a drive plate end thereof and tapered surfaces at an end opposite said drive plate end, said tapered surfaces defining an exit drop point therebetween, said feed rollers journaled in said drive plate and in one of said end plates, said sort and transport rollers journaled in said drive plate and another of said end plates, said feed rollers disposed above said sort and transport rollers, said pivot plate of said roller assembly rotatably affixed to a base frame of a high speed tablet feeder at a pivot, said base frame provided with a counting and reject block and a tablet chute adjacent said pivot, said counting and reject block containing a product count sensor, said counting and reject block having a curved wall centered on said pivot, said pivot having a centerline thereof that is perpendicular to a centerline between said sort and transport rollers at said exit drop point so that said exit drop point remains fixed regardless of an angle at which said roller assembly is disposed with respect to said base frame, said pivot plate provided with said handle affixed thereto adjacent said drive plate, said tablet chute fixedly mounted to said base frame, a discharge chute fixedly mounted to said base frame and in alignment with said tablet chute, said roller assembly pivotally mounted upon said base frame, said roller assembly driven by said prime mover wherein one of said feed rollers is operatively connected to said prime mover and one of said sort and transport rollers is operatively connected to said prime mover, said side plates joined to said end plates and said drive plate wherein said drive plate and said end plates are affixed to said pivot plate, said drive plate and said end plates supporting said feed rollers and said sort and transport rollers in a spaced relationship from said pivot plate and wherein said prime mover is carried by said drive plate.

2. A roller assembly as in claim 1 wherein said pivot plate is pivotable relative to said base frame at said pivot, said pivot disposed in a pivot support wherein said pivot support is affixed to a top plate of said base frame, said pivot support extending upwardly from said base frame.

3. A roller assembly as in claim 2 wherein said pivot plate is removably affixed to said base frame at said pivot.

4. A roller assembly as in claim 1 wherein said feed rollers feed tablets toward a discharge end of said feed rollers, said tablets discharged from said discharge end of said feed rollers onto said pair of sort and transport rollers.

5. A roller assembly as in claim 4 wherein said sort and transport rollers sort said tablets into an orderly stream on a sort portion thereof and feed said tablets toward a discharge end of said sort and transport rollers along a transport portion thereof, said tablets discharged from said discharge end of said sort and transport rollers in a stable aspect established upon said sort and transport rollers of said roller assembly, said tablets passing through a sensor field generated by said product count sensor.

6. A roller assembly as in claim 5 wherein speed and direction of said feed rollers is controlled independent of speed and direction of said sort and transport rollers.

7. A roller assembly as in claim 5 wherein said pivot plate of said roller assembly is disposed at an angle relative to said base frame to alter a feed and transport rate of said tablets.

8. A roller assembly as in claim 7 wherein said hopper of said roller assembly is affixed to said side plates.

9. A roller assembly as in claim 8 wherein said feed rollers of said roller assembly have a feed end disposed generally under said hopper, said feed end provided with a thread disposed thereupon.

10. A roller assembly as in claim 9 wherein said thread of said feed roller is superimposed upon said feed roller and has a substantially square profile.

11. A roller assembly as in claim 10 wherein a transport portion of said sort and transport roller of said roller assembly is superimposed upon said sort and transport roller and has a thread disposed thereupon.

12. A roller assembly as in claim 11 wherein said thread of said transport portion is disposed at a greater helix angle than said thread on said feed rollers.

13. A roller assembly as in claim 12 wherein said thread of said transport portion is a compound thread having a different helix angle for different portions of said sort and transport roller.

14. A roller assembly for a high-speed tablet feeder comprising a pair of feed rollers and a pair of sort and transport rollers, at least one prime mover, a drive plate, at least two end plates, a pair of side plates, at least one tablet guide, a pivot plate, a handle, a stop pin and a hopper, said feed rollers further comprising a pair of gears at a drive plate end thereof and a blunt end opposite said drive plate end, said sort and transport rollers further comprising a pair of gears at a drive plate end thereof and tapered surfaces at an end opposite said drive plate end, said tapered surfaces defining an exit drop point therebetween, said feed rollers journaled in said drive plate and in one of said end plates, said sort and transport rollers journaled in said drive plate and another of said end plates, said feed rollers disposed above said sort and transport rollers, said pivot plate of said roller assembly rotatably affixed to a base frame of a high speed tablet feeder at a pivot, said base frame provided with a counting and reject block and a tablet chute adjacent said pivot, said counting and reject block provided with a curved wall surface, said counting and reject block containing a product count sensor and wherein an arc centered on said pivot extends through said exit drop point and is tangent to a centerline between said sort and transport rollers so that said exit drop point remains fixed regardless of an angle at which said roller assembly is disposed with respect to said base frame, said pivot plate provided with said handle affixed thereto adjacent said drive plate, said tablet chute fixedly mounted to said base frame, a discharge chute fixedly mounted to said base frame and in alignment with said tablet chute, said roller assembly pivotally mounted upon said base frame, said roller assembly driven by said prime mover wherein one of said feed rollers is operatively connected to said prime mover and one of said sort and transport rollers is operatively connected to said prime mover, said side plates joined to said end plates and said drive plate wherein said drive plate and said end plates are affixed to said pivot plate, said drive plate and said end plates supporting said feed rollers and said sort and transport rollers in a spaced relationship from said pivot plate and wherein said prime mover is carried by said drive plate.

15. A roller assembly as in claim 14 wherein said curved wall surface of said counting and reject block is centered on said pivot.

16. A roller assembly as in claim 15 wherein said product count sensor is disposed tangent to a line extending from said curved wall surface of said counting and reject block.

17. A roller assembly for a high-speed tablet feeder comprising a pair of feed rollers and a pair of sort and transport rollers, at least one prime mover, a drive plate, at least two end plates, a pair of side plates, at least one tablet guide, a pivot plate, a handle, a stop pin and a hopper, said feed rollers further comprising a pair of gears at a drive plate end thereof and a blunt end opposite said drive plate end, said sort and transport rollers further comprising a pair of gears at a drive plate end thereof and tapered surfaces at an end opposite said drive plate end, said tapered surfaces defining an exit drop point therebetween, said feed rollers journaled in said drive plate and in one of said end plates, said sort and transport rollers journaled in said drive plate and another one of said end plates, said feed rollers disposed above said sort and transport rollers, said pivot plate of said roller assembly rotatably affixed to a base frame of a high speed tablet feeder at a pivot, said base frame provided with a counting and reject block and a tablet chute adjacent said pivot, said counting and reject block provided with a curved wall surface, said counting and reject block containing a product count sensor and wherein said curved wall surface is an arc centered on said pivot, an axis of said pivot extending through said exit drop point perpendicular to a centerline between said sort and transport rollers so that said exit drop point remains fixed regardless of an angle at which said roller assembly is disposed with respect to said base frame, said pivot plate provided with said handle affixed thereto adjacent said drive plate, said tablet chute fixedly mounted to said base frame, a discharge chute fixedly mounted to said base frame and in alignment with said tablet chute, said roller assembly pivotally mounted upon said base frame, said roller assembly driven by said prime mover wherein one of said feed rollers is operatively connected to said prime mover and one of said sort and transport rollers is operatively connected to said prime mover, said side plates joined to said end plates and said drive plate wherein said drive plate and said end plates are affixed to said pivot plate, said drive plate and said end plates supporting said feed rollers and said sort and transport rollers in a spaced relationship from said pivot plate, said hopper provided with an angled bottom wall and wherein said prime mover is carried by said drive plate.

18. A roller assembly as in claim 17 wherein said angled bottom wall of said hopper is disposed adjacent said feed rolls.

19. A roller assembly as in claim 18 wherein said angled bottom wall of said hopper terminates adjacent a feed thread of said feed rolls.

20. A roller assembly as in claim 17 wherein said feed rolls turn upwardly and outwardly and said sort and transport rolls turn upwardly and outwardly.

* * * * *